US008466406B2

(12) United States Patent
Hvass et al.

(10) Patent No.: US 8,466,406 B2
(45) Date of Patent: Jun. 18, 2013

(54) WIDE-ANGLE LASER SIGNAL SENSOR HAVING A 360 DEGREE FIELD OF VIEW IN A HORIZONTAL PLANE AND A POSITIVE 90 DEGREE FIELD OF VIEW IN A VERTICAL PLANE

(75) Inventors: Paul B. Hvass, San Antonio, TX (US); Michael J. McFadden, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 281 days.

(21) Appl. No.: 13/106,290

(22) Filed: May 12, 2011

(65) Prior Publication Data

US 2012/0286147 A1 Nov. 15, 2012

(51) Int. Cl.
*H01L 31/00* (2006.01)

(52) U.S. Cl.
USPC ........................................ 250/214.1; 250/228

(58) Field of Classification Search
USPC .............. 250/214.1, 228, 216, 239, 221, 235, 250/203.4; 356/141.3–141.5, 365; 244/3.16
See application file for complete search history.

(56) References Cited

U.S. PATENT DOCUMENTS

| | | | |
|---|---|---|---|
| 4,624,563 A * | 11/1986 | Johnson | 356/141.3 |
| 5,134,680 A | 7/1992 | Schempp | |
| 5,429,635 A | 7/1995 | Purcell, Jr. et al. | |
| 5,892,867 A | 4/1999 | Riser et al. | |
| 6,086,234 A | 7/2000 | Riser et al. | |
| 6,292,608 B1 | 9/2001 | Toh | |
| 6,473,238 B1 | 10/2002 | Daniell | |
| 6,501,543 B2 | 12/2002 | Hedges et al. | |
| 6,678,098 B2 | 1/2004 | Amery et al. | |
| 6,847,865 B2 | 1/2005 | Carroll | |
| 6,999,110 B2 | 2/2006 | Kobayashi | |
| 7,059,778 B2 | 6/2006 | Suzuki et al. | |
| 7,110,092 B2 | 9/2006 | Kasper et al. | |
| 7,228,232 B2 | 6/2007 | Bodin et al. | |
| 7,277,053 B2 | 10/2007 | Riel et al. | |
| 7,347,555 B2 | 3/2008 | Grover | |
| 7,375,312 B2 | 5/2008 | Butterworth | |
| 7,429,997 B2 | 9/2008 | Givon | |
| 7,518,099 B2 | 4/2009 | Pallaro et al. | |
| 7,546,187 B2 | 6/2009 | Bodin et al. | |
| 7,593,794 B2 | 9/2009 | Chahl et al. | |

(Continued)

FOREIGN PATENT DOCUMENTS

EP      1096268      5/2001

OTHER PUBLICATIONS

Chen, "Efficient Block Matching Algorithm for Motion Estimation," International Journal of Signal Processing 5;2. pp. 133-137, 2009.

(Continued)

*Primary Examiner* — Que T Le
(74) *Attorney, Agent, or Firm* — Grossman, Tucker et al.

(57) ABSTRACT

A laser sensor comprising a sensor head to receive laser light. The sensor head may have a globe-shaped optical member, the globe-shaped optical member may be optically coupled to an optical-to-electrical converter, the optical-to-electrical converter may be configured to convert laser light from the sensor head to an electronic output signal, and the sensor head may be configured to provide a 360 degree field of view in a horizontal plane and a positive (+) 90 degree field of view in a vertical plane above the horizontal plane.

29 Claims, 18 Drawing Sheets

U.S. PATENT DOCUMENTS

| | | | |
|---|---|---|---|
| 7,619,754 | B2 | 11/2009 | Riel et al. |
| 2004/0066449 | A1 | 4/2004 | Givon |
| 2006/0074557 | A1 | 4/2006 | Mulligan et al. |
| 2006/0268360 | A1 | 11/2006 | Jones |
| 2007/0103698 | A1 | 5/2007 | Liu et al. |
| 2007/0103699 | A1 | 5/2007 | Kohnen et al. |
| 2008/0033604 | A1 | 2/2008 | Margolin |
| 2008/0084568 | A1 | 4/2008 | Rich |
| 2008/0085077 | A1 | 4/2008 | Miyanari |
| 2008/0225406 | A1 | 9/2008 | Wada |
| 2008/0309949 | A1 | 12/2008 | Rueb |
| 2008/0316462 | A1 | 12/2008 | Riel et al. |
| 2009/0244534 | A1 | 10/2009 | Narayana et al. |
| 2011/0106339 | A1 | 5/2011 | Phillips et al. |
| 2011/0285590 | A1 | 11/2011 | Wellington |

OTHER PUBLICATIONS

Chen, et al., "Fast Block Matching Algorithms for Motion Estimation," Department of Electrical and Electronic Engineering, The University of Hong Kong. IEEE International Conference on Acoustics, Speech, and Signal Processing, 1996. ICASSP-96 vol. 4.

Flightgear, "FlightGear Flight Simulator Product Features," available at http://www.flightgear.org/features.html, retrieved on Apr. 6, 2010.

General Dynamics, "Multiple Unified Simulation Environment/Air Force Synthetic Environment for Reconnaissance and Surveillance (MUSE/AFSERS)," available at http://www.gdc4s.com/content/detail.cfm?item=cf9ff114-9876-4e5d-b722-5fa932126f1d retrieved on Apr. 6, 2010.

Grzywna, et al., "Rapid Development of Vision-Based Control for MAVs through a Virtual Flight Testbed," Proceedings of the 2005 IEEE International Conference on Robotics and Automation, 2005. Issue Date: Apr. 18-22, 2005; pp. 3696-3702.

The Mathworks, Inc., "Block Matching Estimate motion between images or video frame," available at http://www.mathworks.com/help/toolbox/vipblks/ref/blockmatching.html, retrieved on Apr. 6, 2010.

McWilliams, et al., "A Simulation Environment for Evaluating Image Processing Techniques for UAV Applications," 09ATC-0054; 2009 SAE International (7 pages).

Persson, "Visual-servoing Based Tracking for an UAV in a 3D simulation Environment," Proceedings of SPIE vol. 4714 (2002).

Proctor, et al. "Vision-Only Aircraft Flight Control Methods and Test Results," AIAA Guidance, Navigation, and Control Conference and Exhibit, Aug. 16-19, 2004, Providence, Rhode Island. (16 pages).

Rathinam, "Vision Based Following of Locally Linear Structures using an Unmanned Aerial Vehicle," Proceedings of the 44th IEEE Conference on Decision and Control, and the European Control Conference 2005, Seville, Spain, Dec. 12-15, 2005.

Shaw, et al., "Landmark recognition for localisation and navigation of aerial vehicles" Proceedings of the 2003 IEEURSJ, InU. Conference on Intelligent Robots and Systems, Las Vegas, Nevada Oct. 2003; pp. 42-47.

Simulink 7, "Product brochure for the MathWorks," available at www.mathworks.com retrieved on Nov. 5, 2010.

Wu, et al., "Vision-Aided Inertial Navigation for Flight Control," AIAA Guidance, Navigation, and Control Conference and Exhibit, Aug. 15-18, 2005, San Francisco, California. (13 pages).

Office Action dated Jun. 6, 2012 issued in related U.S. Appl. No. 12/693,669 (11 pgs).

U.S. Office Action, mail date Dec. 11, 2012, issued in related U.S. Appl. No. 12/796,429 (10 pgs).

U.S. Final Office Action, mail date Dec. 3, 2012, issued in related U.S. Appl. No. 12/693,669 (14 pgs).

\* cited by examiner

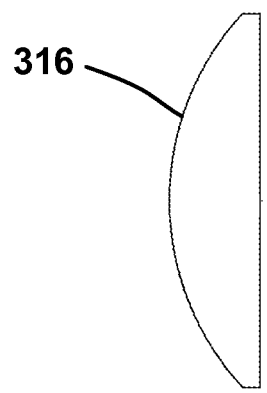
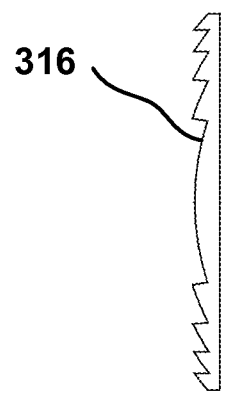
FIG. 6   FIG. 7
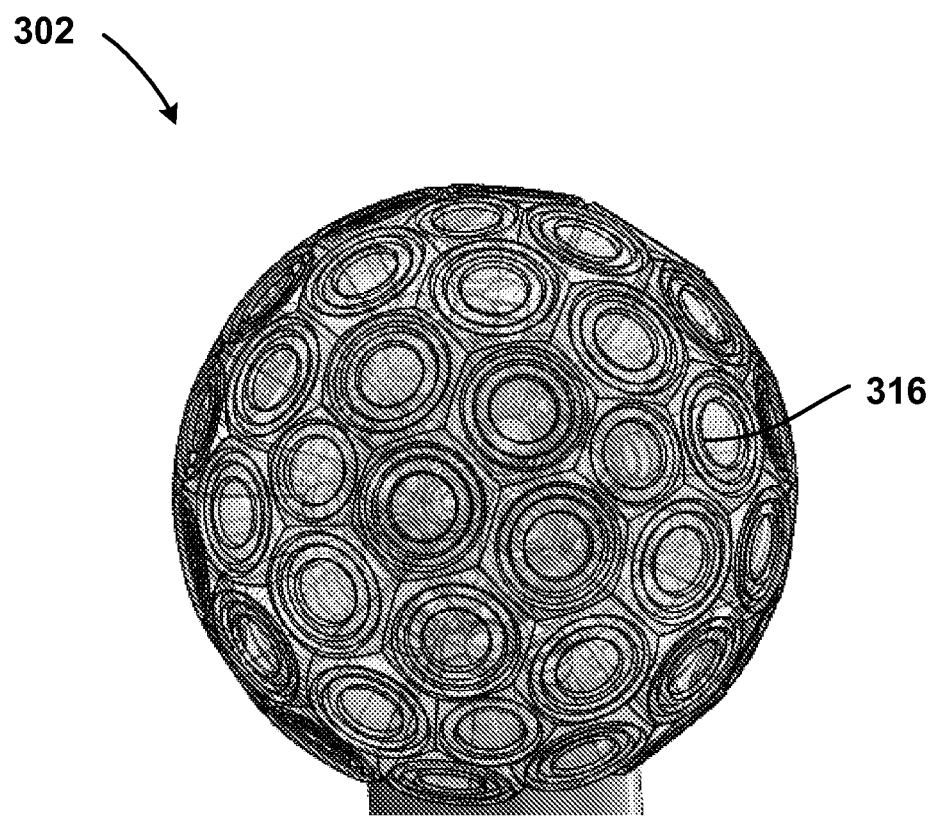
FIG. 8

WIDE-ANGLE LASER SIGNAL SENSOR HAVING A 360 DEGREE FIELD OF VIEW IN A HORIZONTAL PLANE AND A POSITIVE 90 DEGREE FIELD OF VIEW IN A VERTICAL PLANE

FIELD OF THE INVENTION

The present disclosure relates to remote detection of laser light, which may comprise one or more signals in the form of one or more pulses, and in particular a sensor to remotely detect laser light. Applications may include laser-based three-dimensional metrology and free-space optical communications.

BACKGROUND

Laser-based metrology systems may be used for large volume metrology, tracking and positioning. A known position sensor may be understood to be in the form of a cylindrical sensor as shown in FIG. 1. The cylindrical sensor may provide a nearly uniform response to laser light orthogonally incident to the cylindrical (vertical) axis, but such response may diminish and distort as the angle of incidence departs from orthogonal. In the limit, when the incident light is aligned with the cylindrical axis of the sensor, the sensor may be understood to be blind to the laser light. While the cylindrical position sensor may be understood to have a 360 degree field of view in the horizontal plane (around the vertical axis), the cylindrical position sensor may be understood to have only a field of view in a vertical plane of approximately ±60 degrees relative to the horizontal plane.

In addition to the above, the foregoing cylindrical sensor may be understood to contain electronic components within the cylindrical structure, which may be electromagnetically unshielded, thus prone to the negative effects of electromagnetic interference (EMI). EMI may be understood to add substantial noise to the output signal of the sensor.

What is needed is a position sensor which, among other features, may overcome the aforementioned limitations in the art of laser-based metrology systems.

Free-space optical communications has certain advantages over wireless radio-frequency (RF) methods, and also waveguide-based optical methods. Specifically, free-space optical communication has the potential for significantly greater bandwidth compared to wireless RF, and does not require a physical connection or medium as compared to waveguide (e.g., fiber-based) optical communication. However, an inherent limitation of free-space optical communication is the requirement for line-of-sight between the transmitter and the receiver, which is dependent on the reciprocal overlap of (optical) transmitter and receiver fields of view.

What is needed is a communication hub that can be used to transmit and/or receive laser signals from a wide range of angles. In addition, a communication hub that could create a multiplicity of separate channels to accommodate multiple bidirectional links would be advantageous for the parallel networking of multiple hub-linked devices.

SUMMARY

The present disclosure describes laser signal sensing apparatus, and methods of use thereof. In certain embodiments, the apparatus may be utilized in a laser-based metrology system or a free-space optical communication network.

The apparatus may include a laser signal sensor, which may be configured to operate as a position sensor for three-dimensional position measurement within the laser-based metrology system, whose output electrical response may be uniform and independent of a laser light signal's angle of incidence on the sensor, as well as a sensor which reduces the contribution of electrical noise to the sensor's output signal.

The laser signal sensor may also be configured to operate as a laser communication transceiver within in the free-space optical communication network, whose receiver response output electrical response may be uniform and independent of a laser light signal's angle of incidence on the sensor and whose transmitter may provide communication channels over a wide range of angles.

The present disclosure may provide a laser signal sensor that has up to a 360 degree field of view in the horizontal plane, which may be understood to be continuous/uninterrupted. The laser signal sensor may also provide a field of view in a vertical plane above the horizontal plane of up to positive 90 degrees (i.e. +90°) relative to the horizontal plane, which also may be understood to be continuous/uninterrupted (where the positive value denotes the field of view above the horizontal plane and the horizontal plane itself is at zero (0) degrees). While the field of view in a vertical plane above the horizontal plane may be up to positive 90 degrees relative to the horizontal plane, it should be understood that the field of view in a vertical plane above the horizontal plane may be configured to be less than a positive 90 degrees relative to the horizontal plane (e.g. up to +30, +45, +60 or +75 degrees). The laser signal sensor may further provide a field of view in a vertical plane below the horizontal plane of up to negative 90 degrees (i.e. −90°) relative to the horizontal plane, which also may be understood to be continuous/uninterrupted (where the negative value denotes the field of view below the horizontal plane and the horizontal plane itself is at zero (0) degrees). While the field of view in a vertical plane below the horizontal plane may be up to negative 90 degrees relative to the horizontal plane, it should be understood that the field of view in a vertical plane below the horizontal plane may be configured to be less than a negative 90 degrees relative to the horizontal plane (e.g. up to −30, −45, −60 or −75 degrees). In certain embodiments, the laser signal sensor may have a complete field of view in both planes, thus being completely omni-directional responsive.

The laser signal sensor may include optical elements optically coupled to optical fibers that transmit incident laser light to an electro-magnetic interference (EMI) shielded optical-to-electrical converter, which may include one or more opto-electronic detectors to provide an electronic signal therefrom.

The laser signal sensor may comprise a laser sensor head to receive laser light. The sensor head may have a globe-shaped optical member, the globe-shaped optical member maybe optically coupled to an optical-to-electrical converter, the optical-to-electrical converter may be configured/operable to convert incident laser light from the sensor head to an electronic output signal.

The globe-shaped optical member may be spherical, and more particularly a full sphere. The globe-shaped optical member may be of a single piece monolithic construction, and may be translucent or transparent, and may be a hollow-shell or solid sphere. The globe-shaped optical member may be coated with a diffusive material or be composed of a homogeneously diffusive material.

The globe-shaped optical member may be configured/operable to diffuse incident laser light which contacts the globe-shaped optical member. More particularly, the globe-shaped optical member may have an outer surface and the globe-shaped optical member may be configured/operable to diffuse incident laser light which contacts the outer surface of the globe-shaped optical member. Even more particularly, the globe-shaped optical member may be configured/operable to uniformly diffuse the incident laser light at the outer surface.

The sensor head may be configured/operable to enable incident laser light to enter the globe-shaped optical member and subsequently emanate from the globe-shaped optical member to be received by the optical-to-electrical converter, which may comprise a photo-detector.

The laser sensor may further comprise a light concentrator, and the light concentrator may be configured/operable to receive laser light which emanates from the globe-shaped optical member and concentrate the laser light prior to the laser light being received by the photo-detector. The light concentrator may comprise a reflective element such as a compound parabolic concentrator, or a diffractive element such as an aspheric lens. The light concentrator may comprise one or more concentrating elements.

The laser sensor may further comprise an optical filter configured/operable to block wavelengths of light other than relevant laser light wavelengths, and the optical filter may be configured/operable to receive laser light which emanates the globe-shaped optical member and filter the laser light prior to the laser light being received by the photo-detector.

The laser sensor head may further comprise a plurality of inner optical elements, and the sensor head may be configured/operable to enable incident laser light to enter the globe-shaped optical member and to be receivable by the inner optical elements. The plurality of inner optical elements may be arranged in a pattern on a hub, and one or more inner optical elements of the plurality of inner optical elements may be a ball lens. Each one of the plurality of inner optical elements may be optically coupled to a respective optical fiber configured/operable to transmit laser light to the optical-to-electrical converter.

The globed-shaped outer member may comprise a plurality of outer optical elements. One or more, and in certain embodiments each and every one (i.e. all), of the outer optical elements may have an outer surface, with the outer surface providing an outer surface portion of the globe-shaped outer member.

One or more, and in certain embodiments each and every one, of the outer optical elements may have a respective field of view, and the field of view may overlap with a field of view of one or more adjacent optical elements, and in certain embodiments each and every, adjacent outer optical element.

One or more, and in certain embodiments each and every one, of the outer optical elements may be respectively configured/operable to concentrate incident laser light which enters the outer optical element.

One or more, and in certain embodiments each and every one, of the outer optical elements may respectively have a convex profile to concentrate incident laser light which enters the outer optical element.

One or more, and in certain embodiments each and every one, of the outer optical elements may respectively have a fresnel profile to concentrate incident laser light which enters the outer optical element.

One or more, and in certain embodiments each and every one, of the outer optical elements may respectively have a graded index of refraction to concentrate incident laser light which enters the outer optical element.

One or more, and in certain embodiments each and every one, of the outer optical elements may be optically coupled to a respective optical fiber such that incident laser light which enters the outer optical element enters the respective optical fiber.

One or more, and in certain embodiments each and every one, of the outer optical elements may have a respective optical axis. One or more, and in certain embodiments each and every one, of the outer optical elements may be optically coupled to a respective optical fiber such that one or more, and in certain embodiments each and every one, of the optical fibers is aligned with the optical axis of its respective outer optical element.

One or more, and in certain embodiments each and every one, of the outer optical elements optically coupled to a respective optical fiber may be optically coupled to the respective optical fiber by a respective inner optical element such that at least a portion, or in certain embodiments all, of the incident laser light which enters the outer optical element enters the respective optical fiber.

One or more, and in certain embodiments each and every one, of the inner optical elements may have a respective optical axis. One or more, and in certain embodiments each and every one, of the inner optical elements may respectively comprise a graded index lens having an index of refraction which increases with an increasing distance radially away from the respective optical axis. One or more, and in certain embodiments each and every one, of the inner optical elements may respectively be a ball lens.

One or more, and in certain embodiments each and every one, of the optical fibers may transmit incident laser light to an optical-to-electrical converter to convert the incident laser light to an electronic output/signal. The laser light sensor head may be connected to the optical-to-electrical converter by a mounting post. One or more, and in certain embodiments each and every one, of the optical fibers may extend from the laser light sensor head through the post to the converter.

One or more, and in certain embodiments each and every one, of the outer optical elements may have a respective optical axis. One or more, and in certain embodiments each and every one, of the outer optical elements may respectively comprise a graded index lens having an index of refraction which increases with an increasing distance radially away from the respective optical axis.

One or more, and in certain embodiments each and every one, of the outer optical elements may have a respective focal point on a respective radial axis extending from a geometric center of the globe-shaped optical member.

In certain embodiments, the outer optical elements may form a tessellating pattern, which may include at least one of a pentagon and a hexagon. In certain embodiments, the outer optical elements may form a substantially complete truncated icosahedron or a substantially complete truncated pentagonal hexecontahedron.

FIGURES

The above-mentioned and other features of this disclosure, and the manner of attaining them, will become more apparent and better understood by reference to the following description of embodiments described herein taken in conjunction with the accompanying drawings, wherein:

FIG. 6 is a schematic cross-sectional side view of the outer surface of an outer optical element having a convex profile according to the present disclosure;

FIG. 7 is a schematic cross-sectional side view of the outer surface of an outer optical element having a fresnel profile according to the present disclosure;

FIG. 8 is a schematic side view of an exemplary sensor head in the form of a truncated icosahedron having a fresnel profile on an outer surface of each outer optical element according to the present disclosure;

DETAILED DESCRIPTION

Figure 1:
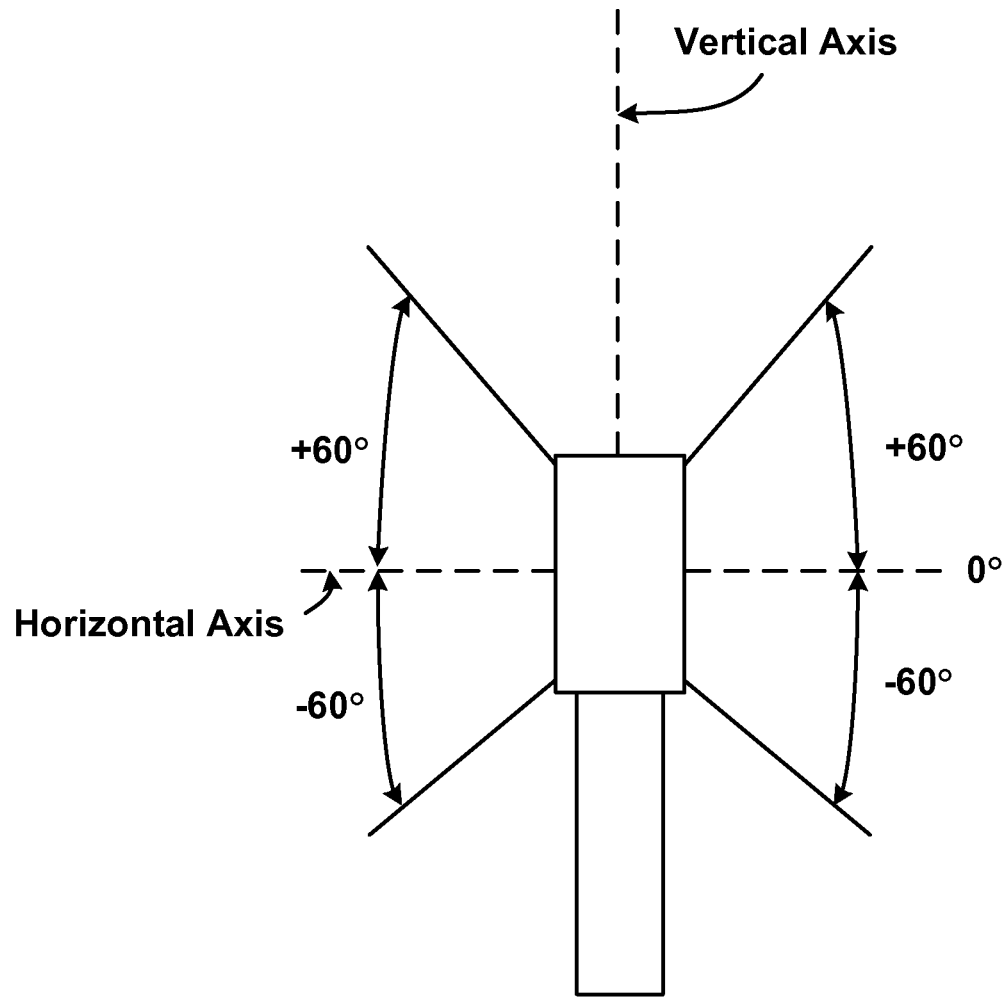
FIG. 1 is a schematic side view of a cylindrical laser signal sensor for a laser-based metrology system understood to be prior art.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Throughout the present description, like reference characters may indicate like structure throughout the several views, and such structure need not be separately discussed. For example, various exemplary embodiments of laser signal sensors are presented herein at reference characters 300, 400 and 500. For similar elements throughout the embodiments, an attempt has been made to keep each reference character within a particular numerical (hundreds) series constant. Thus, an element identified at reference character 310 for laser signal sensor 300 may be understood to correspond to reference characters 410 and 510 for laser signal sensors 400 and 500, respectively. Thus, where an exemplary embodiment description uses a reference character to refer to an element, the reference character may be understood to generally apply equally, as distinguished by series, to the other exemplary embodiments where the element is common. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Figure 2:
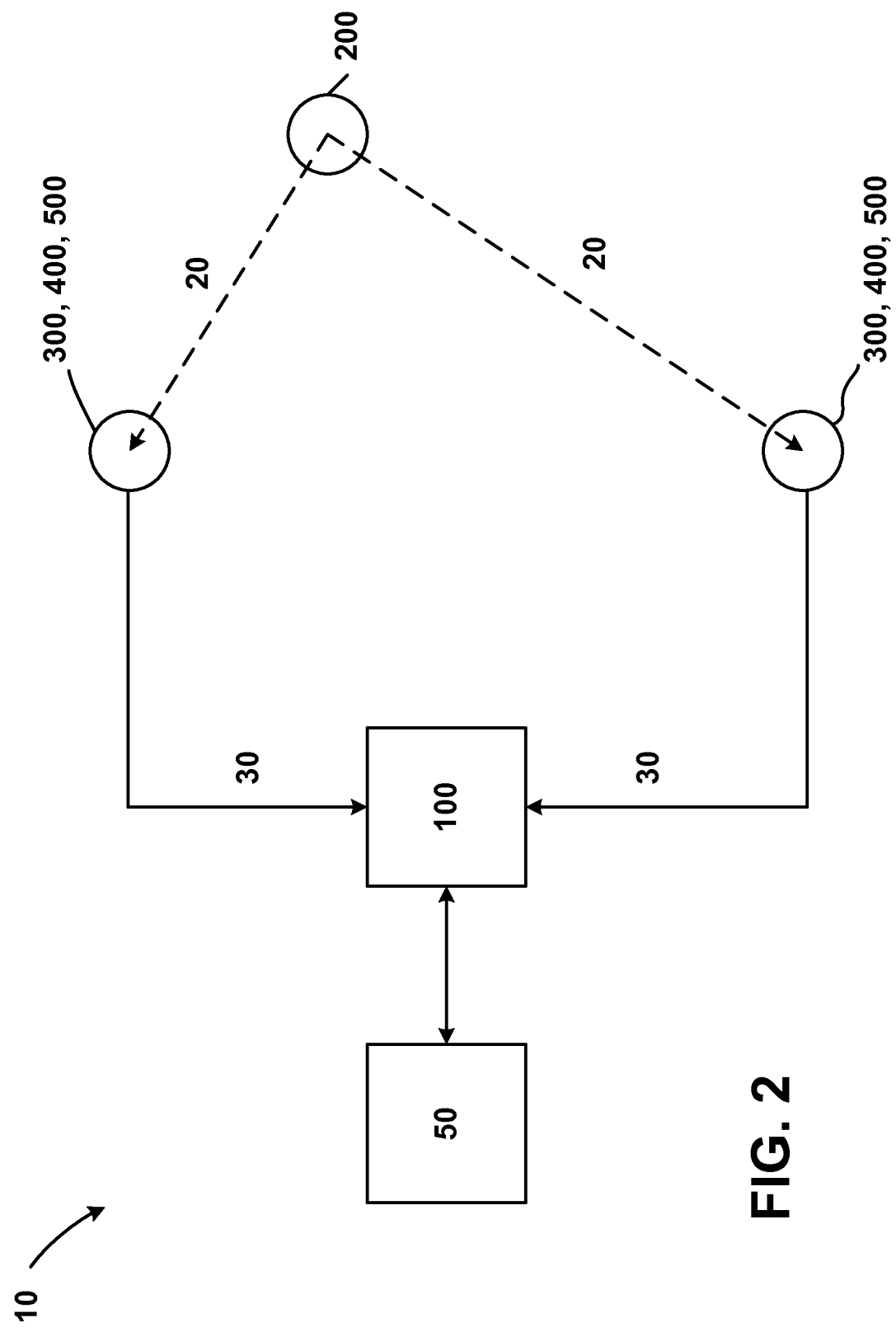
FIG. 2 is a schematic plan view of an exemplary laser signal sensing apparatus having one or more laser signal sensors according to the present disclosure.

Referring now to FIG. 2, FIG. 2 schematically illustrates an exemplary laser signal sensing apparatus 10 according to the present disclosure, which may be part of a system or network such as a laser-based metrology system or a free-space optical communication network.

As shown, apparatus 10 may comprise a receiver/hub 100 which may be configured/operable to receive electronic signals 30, either via an electrical conductor, such as a wire, or wirelessly via an antenna, provided from one or more laser signal sensors 300/400/500 in electronic communication with the receiver/hub 100, in response to laser light 20 from a laser transmitter 200 detected by the sensors 300/400/500. Apparatus 10 may further include a computer 50 having a graphical user interface and software to communicate with receiver/hub 100.

Figure 3:
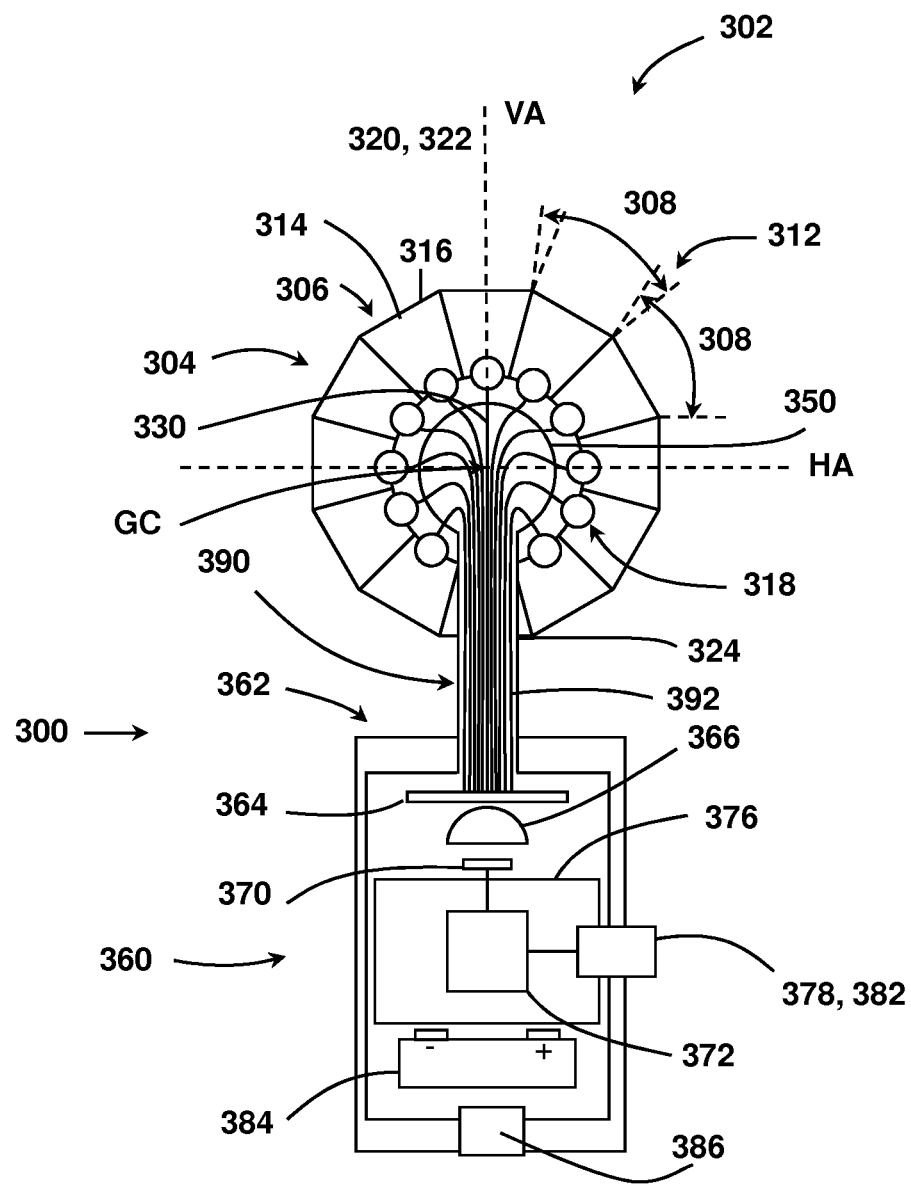
FIG. 3 is a schematic cross-sectional side view of an exemplary laser signal sensor according to the present disclosure.

Referring now to FIG. 3, there is shown a laser signal sensor 300 according to the present disclosure. Laser signal sensor 300 may comprise a globe-shaped sensor head 302, particularly comprising a globe-shaped optical member 304.

Figure 4:
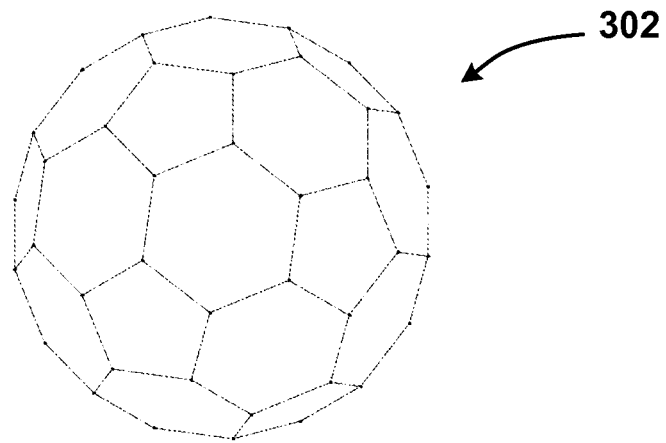
FIG. 4 is a schematic side view of an exemplary sensor head in the form of a truncated icosahedron which may be used with a laser signal sensor according to the present disclosure.

Globe-shaped sensor head 302, and in particular globe-shaped optical member 304, may have a multi-faceted shape, such as of an Archimedean solid, which may be understood to be a highly symmetric, semi-regular convex polyhedron composed of two or more types of regular polygons meeting in identical vertices. An exemplary Archimedean solid shape may be a truncated icosahedron, as shown in FIG. 4, which may be understood to be made up of a tessellating pattern of 20 equilateral hexagons and 12 equilateral pentagons.

In certain embodiments, globe-shaped sensor head 302, and in particular globe-shaped optical member 304, may have a shape of a substantially complete truncated icosahedrons, as opposed to a complete truncated icosahedron, particularly due to certain features which may facilitate connection of the globe-shaped sensor head 302 to the remainder of sensor 300, or exit globe-shaped sensor head 302 from therein, such as a bundle 392 of optical fibers 330, as explained in greater detail below. In certain embodiments, globe-shaped sensor head 302, and in particular globe-shaped optical member 304, may have an outer surface area of about 90% of a full truncated icosahedron of a same dimension.

Figure 5:
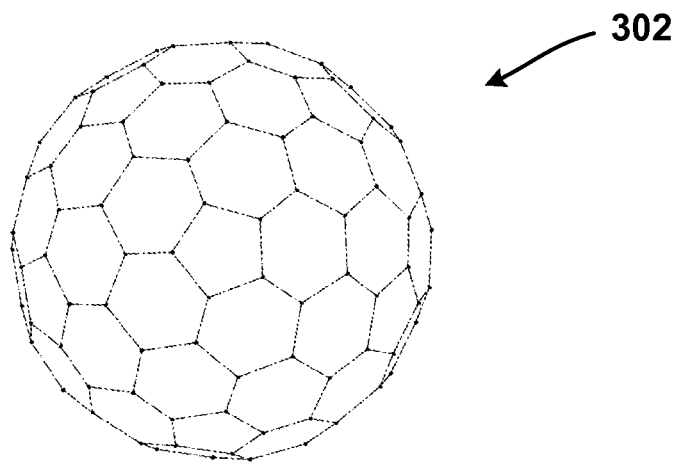
FIG. 5 is a schematic side view of an exemplary sensor head in the form of a truncated pentagonal hexecontahedron which may be used with a laser signal sensor according to the present disclosure.

Globe-shaped sensor head 302 may also have a shape of a Catalan solid, which may also be known as an Archimedean dual, which may be understood to be a dual polyhedron to an Archimedean solid. An exemplary Catalan solid shape may be a pentagonal hexecontahedron, which may be understood to be made up of a tessellating pattern of 60 identical irregular pentagons, with the solid made up of the 60 irregular pentagons arranged in 12 clusters of 5 pentagons each. Truncating the vertex of each cluster may be understood to yield a 72 facet shape of a truncated pentagonal hexecontahedron, as shown in FIG. 5, which may be understood to be made up of irregular hexagons and equilateral pentagons.

As with the truncated icosahedrons, in certain embodiments, globe-shaped sensor head 302, and in particular globe-shaped optical member 304, may have a shape of a substantially complete truncated pentagonal hexecontahedron, as opposed to a complete truncated pentagonal hexecontahedron, particularly due to certain features which may facilitate connection of the globe-shaped sensor head 302 to the remainder of sensor 300, or exit globe-shaped sensor head 302 from therein, such as a bundle 392 of optical fibers 330, as explained in greater detail below. In certain embodiments, globe-shaped sensor head 302, and in particular globe-shaped optical member 304, may have an outer surface area of about 90% of a full truncated pentagonal hexecontahedron of a same dimension.

From the foregoing, it should be understood that the exemplary embodiments of globe-shaped sensor head 302, and in particular globe-shaped optical member 304, having a multi-faceted shape particularly of an Archimedean solid or a Catalan solid should not be considered limiting of the disclosure. In certain embodiments, globe-shaped sensor head 302 may have a shape of a substantially complete faceted solid with more than or less than 72 facets, that may be regular or irregular, and may be identical or non-identical.

Thus, as shown, globe-shaped sensor head 302 may be understood to comprise a globe-shaped optical member 304 having many facets, which may be in a tessellated pattern or other array. The facets may particularly have the shape of pentagons or hexagon which are arranged to form a pentagonal and/or hexagonal tessellation.

Referring back to FIG. 3, globe-shaped optical member 304 may be part of a plurality of multi-component optical assemblies 306. Each optical assembly 306 may particularly comprise a non-imaging outer optical element 314, which may be provided by globe-shaped optical member 304, and inner optical element 318.

As discussed in greater detail below, one or more of the optical assemblies 306 may be configured/operable to concentrate incident laser light (and increase a photon flux density thereof) which enters the optical assembly 306, and couple incident laser light into an optical fiber 330, particularly into an end (aperture) thereof. It should be understood herein that when incident laser light is concentrated, the photon flux density is to be increased. As such, the terms "concentrate/concentrating" should be broadly understood to include any structure/method which may increase the photon flux density (e.g. condense/condensing, converge/converging, focus/focusing).

In certain embodiments each and every one (i.e. all) of the optical assemblies 306 may be configured/operable to concentrate incident laser light which enters the optical assembly 306, and couple incident laser light into a respective optical fiber 330, particularly into an end (aperture) thereof. Thus, the globe-shaped sensor head 302 is configured/operable to enable incident laser light to enter the outer optical elements 314 provided by globe-shaped optical member 304 and to be receivable by the inner optical elements 318.

To inhibit blind spots between adjacent optical assemblies 306 (i.e. locations where laser light 20 may not be detected), the steradian acceptance angle 308, or field of view FOV, of one or more optical assemblies 306 may share a common boundary with the steradian acceptance angle 308 occupied by an adjacent optical assembly 306. In this manner, a continuous (uninterrupted) field of view FOV may be provided by the adjacent optical assemblies 306.

In certain embodiments, one or more of the optical assembles 306 may have a respective field of view FOV (as determined by the acceptance angle) which may be understood to overlap 312 with one or more adjacent optical assemblies 306. In other embodiments, to ensure there are no blind spots between optical assemblies 306, each and every one of the optical assemblies 306 may be understood to have a respective field of view FOV which overlaps 312 with the respective field of view FOV of each and every adjacent optical assembly 306.

One or more of the optical assemblies 306 may comprise an outer optical element 314, particularly having an outer surface 316. In certain embodiments each and every one of the optical assemblies 306 may respectively comprise an outer optical element 314 having an outer surface 316, which provides a surface portion of the globe-shaped optical member 304. As shown in FIG. 3, in certain embodiments, surface 316 may have a planar (flat) profile, or have a convex profile as shown in FIG. 6, or a fresnel profile as shown in FIGS. 7 and 8.

Outer optical element 314 may be made of glass, or a plastic material, such as polymethyl methacrylate (PMMA) or polystyrene (PS), and may be transparent or translucent. In certain embodiments, translucent (semi-opaque) material may be more desirable due to bulk and surface scattering effects of the incident laser light, which may increase fiber coupling efficiency and uniformity.

One or more of the outer optical elements 314 may be configured/operable to concentrate incident laser light which enters the outer optical element 314. In certain embodiments each and every one of the outer optical elements 314 may be respectively configured/operable to concentrate incident laser light which enters the outer optical element 314. More particularly, each outer optical element 314 may concentrate incident laser light on an inner optical element 318 which couples the light to an optical fiber 330 as discussed in greater detail below.

One or more of the outer optical elements 314 may have a graded index of refraction to concentrate incident laser light which enters the outer optical element 314. In certain embodiments each and every one of the outer optical elements 314 may respectively have a graded index of refraction to concentrate incident laser light which enters the outer optical element 314.

More particularly, one or more of the outer optical elements 314 may have an optical (principal) axis 320, and outer optical element 314 may comprise a graded index lens having an index of refraction which increases with an increasing distance radially away from the optical axis 320. In certain embodiments, each and every one of the outer optical elements 314 may have a respective optical axis 320, and each and every one of the outer optical elements 314 may respectively comprise a graded index lens having an index of refraction which increases with an increasing distance radially away from the respective optical axis 320. In this manner, incident laser light which enters each of outer optical elements 314 may be concentrated towards its respective optical (principal) axis 320.

One or more of the outer optical elements 314 may be optically coupled to an optical fiber 330 such that incident laser light which enters the outer optical element 314 enters the optical fiber 330, particularly at an end thereof. In certain embodiments, each and every one of the outer optical elements 314 may be optically coupled to a respective optical fiber 330 such that incident laser light which enters the outer optical element 314 enters the respective optical fiber 330, particularly at an end thereof. Optical fiber 330 may be made of a glass or plastic material, such as polymethyl methacrylate (PMMA) or polystyrene (PS), and may have a diameter in a range of and any increments between 0.1 mm to 2 mm.

More particularly, one or more of the outer optical elements 314 may have an optical (principal) axis 320, and the outer optical element 314 may be optically coupled to the optical fiber 330 such that the optical fiber 330 is aligned with the optical axis 320 of the outer optical element 314, particularly at an end thereof. In certain embodiments, each and every one of the outer optical elements 314 may have a respective optical axis 320, and each and every one of the outer optical elements 314 may be optically coupled to a respective optical fiber 330 such that one or more, and in certain embodiments each and every one, of the optical fibers 330 is aligned with the optical axis 320 of its respective outer optical element 314, particularly at an end thereof. Even more particularly, the outer optical element 314 may be optically coupled to the optical fiber 330 such that the optical fiber 330 has an optical fiber axis that is aligned with the optical axis 320 of the outer optical element 314, particularly at an end thereof. In other words, a longitudinal axis of the optical fiber 330 at its end and an optical axis 320 of outer optical element 314 may be understood to be the same or a common axis.

In addition to the foregoing, one or more of the outer optical elements 314 may have a focal point on a radial axis extending from a geometric center GC of the globe-shaped optical member 304 (where the horizontal axis HA and vertical axis VA cross). In certain embodiments, each and every one of the outer optical elements 314 may have a respective focal point on a respective radial axis extending from a geometric center of the globe-shaped optical member 304. Furthermore, the optical axis 320 of each and every one of the outer optical elements 314 may be the same as the radial axis to better ensure optical coupling thereof with each respective optical fiber 330. Thus it may be understood, that a radial axis extending from a geometric center of the globe-shaped optical member 304 may be the same or a common axis with an optical axis 320 of outer optical element 314 and an optical fiber 330 coupled thereto.

As shown, each one of the outer optical elements 314 may narrow as it extends from an outer surface 316 towards a geometric center GC of the globe-shaped optical member 304 whereby the outer optical elements 314 may fit together. Each of outer optical elements 314 may be separately formed and connected together with a suitable adhesive between adjacent (neighboring) sides. Alternatively, clusters of outer optical elements 314 may be formed comprising a plurality of outer optical members 314, and the clusters may be thereafter connected (bonded) with a suitable adhesive therebetween.

Continuing with FIG. 3, one or more of the optical assemblies 306 may further comprise an inner optical element 318, and the outer optical element 314 may be optically coupled to an optical fiber 330 by the inner optical element 318. In certain embodiments, each and every one of the optical assemblies 306 may respectively comprises an inner optical element 318, and each and every one of the outer optical elements 314 optically coupled to a respective optical fiber 330 may be optically coupled to the respective optical fiber 330 by the respective inner optical element 318.

One or more of the inner optical elements 318 may have an optical (principal) axis 322, and inner optical element 318 may comprise a graded index lens having an index of refraction which increases with an increasing distance radially away from the optical axis 322. In certain embodiments, each and every one of the inner optical elements 318 may have a respective optical axis 322, and each and every one of the inner optical elements 318 may respectively comprise a graded index lens having an index of refraction which increases with an increasing distance radially away from the respective optical axis 322.

One or more of the inner optical elements 318 may be a ball lens, and may be made of glass, or a plastic material, such as polymethyl methacrylate (PMMA) or polystyrene (PS), and may be transparent or translucent. In certain embodiments, each and every one of the inner optical elements 318 may respectively comprise a ball lens, which may increase the magnitude and uniformity of the coupling of incident laser light into the optical fibers 330.

Figure 9:
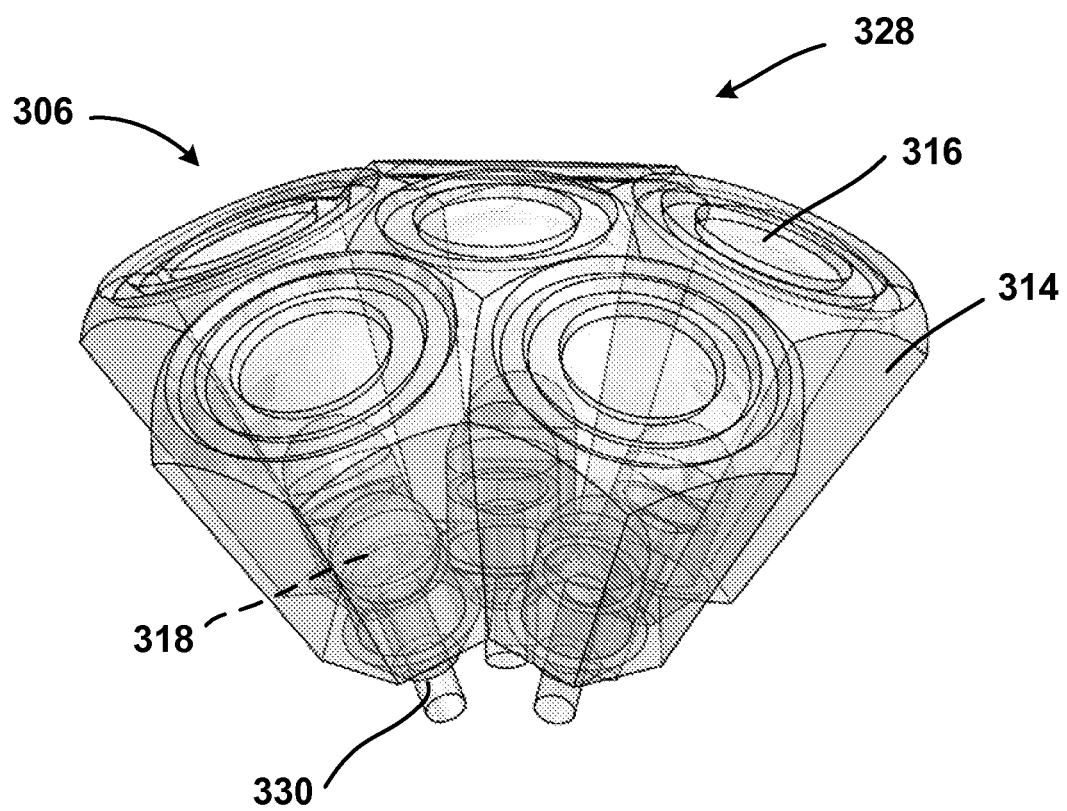
FIG. 9 is a schematic side view of a cluster of outer and inner optical elements of the truncated pentagonal hexecontahedron of FIG. 5 optically coupled to optical fibers according to the present disclosure.

Referring now to FIG. 9, there is shown an exemplary cluster 328 of optical assemblies 306, which may be understood to be one of twelve clusters 328 which may form the truncated pentagonal hexecontahedron shown in FIG. 5. The truncated pentagonal hexecontahedron may be preferred to the truncated icosahedron to reduce the stress on the optical design. For example, with a truncated icosahedron, the hexagonal facets may be understood to subtend a ±23.8 degree steradian angle, while the pentagon patches may be understood to subtend a ±20.1 degree steradian angle. In contrast, for a truncated pentagonal hexecontahedron, the hexagonal facets may be understood to subtend a ±15.5 degree steradian angle, while the pentagon patches may be understood to subtend a ±13.4 degree steradian angle. The truncated pentagonal hexecontahedron may be preferred to the truncated icosahedron given the maximum subtended angle for any facet is approximately ±15.5 degrees, which is more manageable to couple to a plastic optical fiber than the larger maximum subtended angle associated with the truncated icosahedron. Other shapes with more facets may enable simpler coupling, but would require more fibers (using up the internal space within the globe-shaped sensor head 302).

Figure 10:
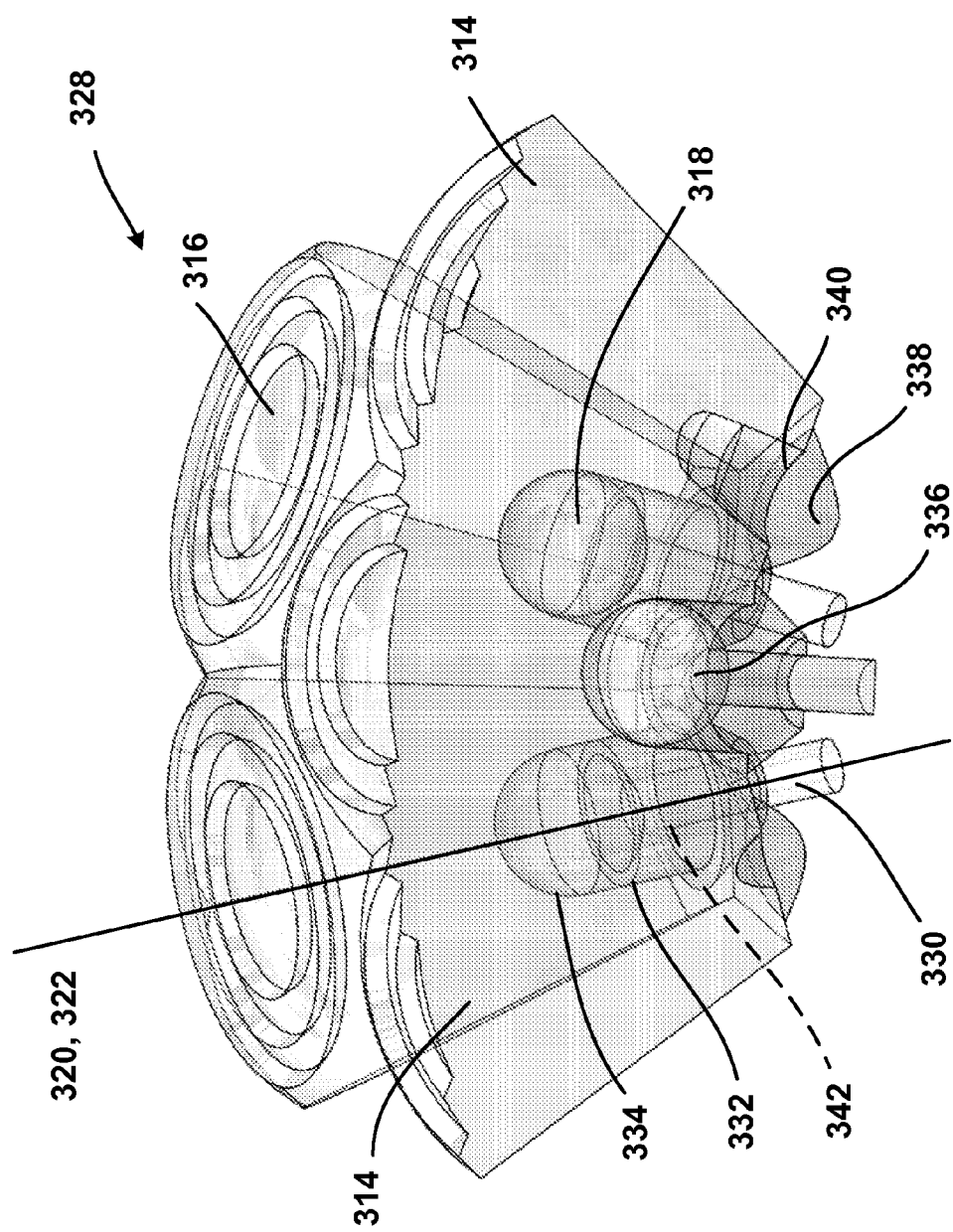
FIG. 10 is a schematic enlarged cross-sectional side view of the cluster of outer and inner optical elements of the truncated pentagonal hexecontahedron of FIG. 10 according to the present disclosure.

A cross-section of cluster 328 of FIG. 9 is shown in FIG. 10. As shown, each outer optical element 314 may include a pocket 332 opposite outer surface 316 to contain inner optical element 318 and hold it in proper position relative to outer optical element 314. As shown, pocket 332 has a distal end surface 334 to conform to the shape of and contact inner optical element 318 to transmit incident light. Thereafter, once inner optical element 318 is within pocket 334, inner optical element 318 may be held within pocket 332 by inserting a press (interference) fit plug 338 within pocket 334, which closes the entrance 340 to pocket 332.

Plug 338 may further include a cylindrical aperture 342 through which optical fiber 330 may pass through and be held in proper position by a press fit such that a distal end 336 of the optical fiber 330 may make contact with the inner optical element 318 to transmit incident light.

Returning to FIG. 3, in certain embodiments, one or more optical assembly 306 may have an outer optical member 314 and an inner optical member 318 having a common optical (principal) axis as shown by axes 320, 322, which may be in common with a longitudinal axis of its respective optical fiber 330 at its end. More particularly, in certain embodiments, each and every one of the optical assemblies 306 may have an outer optical member 314 and inner optical member 318 having a common optical (principal) axis as shown by axes 320, 322, which may be in common with a longitudinal axis of its respective optical fiber 330 at its end.

Continuing with FIG. 3, one or more of the optical fibers 330 may transmit incidental laser light to an optical-to-electrical converter 360 to convert the incident laser light to a low noise electronic output/signal. In certain embodiments, each and every one of the optical fibers 330 may transmit incident laser light to optical-to-electrical converter 360 to convert the incident laser light to a low noise electronic output/signal.

Converter 360 may comprise an electromagnetically shielded housing/enclosure 362 containing various elements to convert the incident laser light to a low noise electronic output/signal. Converter 360 may include an optical filter 364 configured/operable to only allow laser light of a particular frequency to pass through the filter 364, while blocking non-laser light (e.g. ambient light).

After passing though optical filter 364, the laser light from each of the optical fibers 330 may be concentrated using a lens 366, such as a condenser lens. After passing through lens 366, the laser light may be converted to an electronic output by at least one optoelectronic detector 370, such as a photo-detector, which may include photo-diode(s), photo-resistor(s) and/or photo-transistor(s).

The electronic output from the optoelectronic detector 370 may be amplified and processed by various circuitry included an amplifier/processing circuit 372, which may be located on a printed circuit board 376. The output may then be coupled to an electronic output connector (e.g. SMA connector) 378 to be wired to receiver/hub 100, or a transmitter 382 which may configured/operable to transmit the electronic signal to receiver/hub 100. The converter 360 may include an internal power source 384, such as a battery, which may be used to power optoelectronic detector 370 and other electronic components and circuitry therein. Housing/enclosure 362 may include mounting means 386 to mount sensor 300 to a suitable structure.

Globe-shaped sensor head 302 may be connected to converter 360 by a hollow mounting post 390 which may include a bundle 392 of the optical fibers 330 therein. Post 390 may be a rigid pipe or other conduit to support and maintain globe-shaped sensor head 302 and converter 360 in fixed relation to one another. Globe-shaped sensor head 302 may have one cluster 328 removed to provide an opening 324 and an exit location for the bundle 392 of optical fibers 330 to exit the globe-shaped sensor head 302. Bundle 392 may be understood to have 66 optical fibers therein for a truncated pentagonal hexecontahedron with one cluster 328 removed.

As globe-shaped sensor head 302 does not operate with electricity, it may be considered to be non-electric. Mounting post 390 may be formed of an electrically shielded material such as a suitable metal. In the foregoing manner, it may be expected that globe-shaped sensor head 302 and post 390 may be more immune to the effects of electromagnetic pulse radiation, thus reducing the noise which may adverse effect the output signal of sensor 300.

Figure 11:
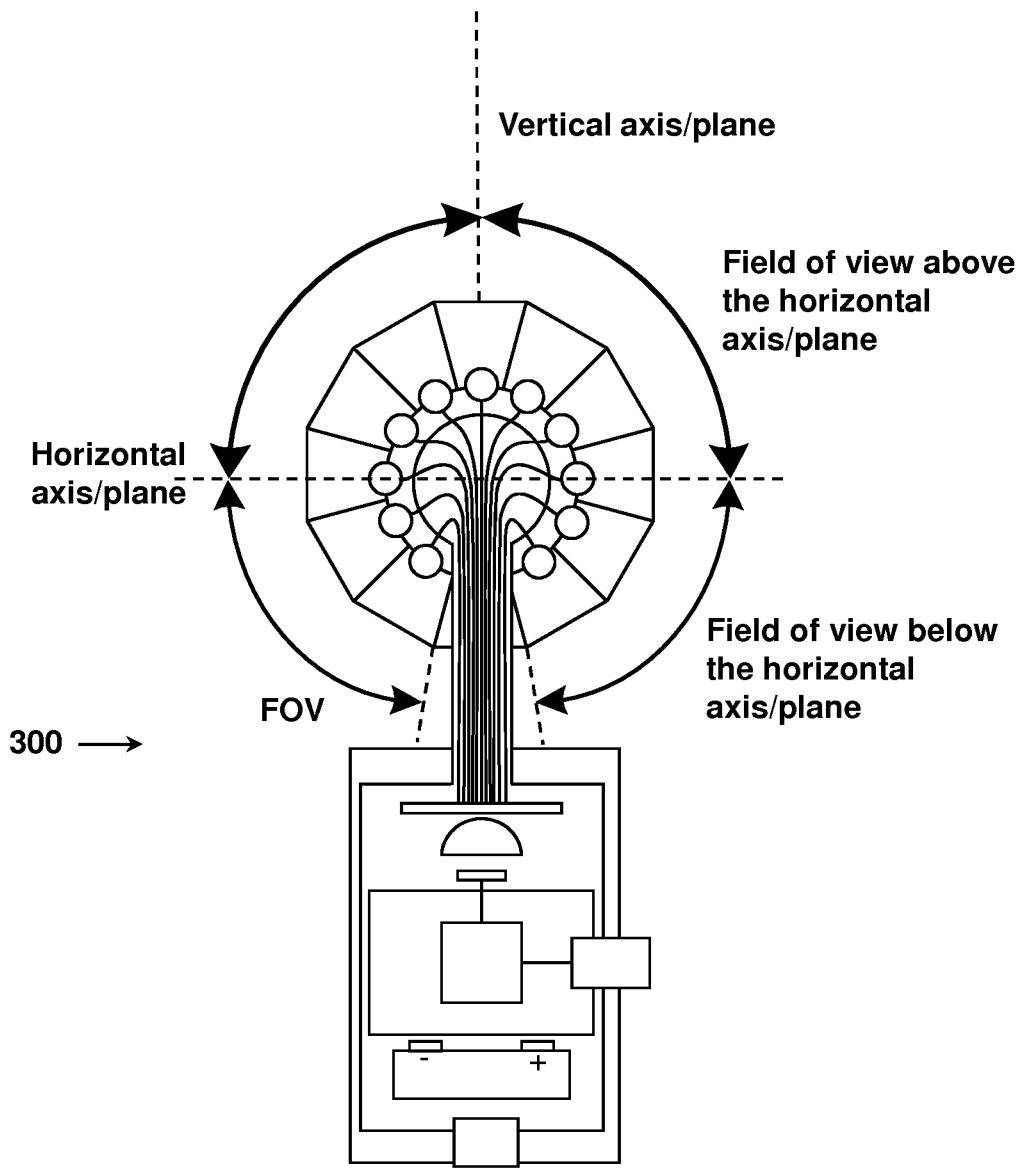
FIG. 11 is a schematic side view of the exemplary laser sensor of FIG. 3 showing the field of view thereof in the vertical plane.

Referring now to FIG. 11, globe shaped sensor head 302, in addition to being configured/operable to provide up to a 360 degree field of view FOV in the horizontal plane around the vertical axis, which may be understood to be continuous/uninterrupted (i.e. with no blind spots), globe-shaped sensor head 302 may configured/operable to provide a field of view FOV in a vertical plane above the horizontal plane of up to positive 90 degrees (i.e. +90°) relative to the horizontal plane, which also may be understood to be continuous/uninterrupted (where the positive value denotes the field of view FOV above the horizontal plane and the horizontal plane itself is at zero (0) degrees). While the field of view FOV in a vertical plane above the horizontal plane may be up to positive 90 degrees relative to the horizontal plane, it should be understood that the field of view FOV in a vertical plane above the horizontal plane may be configured/operable to be less than a positive 90 degrees relative to the horizontal plane (e.g. up to +30, +45, +60 or +75 degrees).

The globe shaped sensor head 302 may also be understood to have a field of view FOV in a vertical plane below the horizontal plane, also continuous/uninterrupted, which may only be limited by the size of mounting post 390, or connection of the globe-shaped sensor head 302 to mounting post 390, or the number of facets removed from globe shaped sensor head 302 to accommodate exit of optical fibers 330 from therein. In certain embodiments, globe-shaped sensor head 302 may configured/operable to provide a field of view FOV in a vertical plane below the horizontal plane of up to negative 75 degrees (i.e. −75°) relative to the horizontal plane, which also may be understood to be continuous/uninterrupted (where the negative value denotes the field of view FOV below the horizontal plane and the horizontal plane itself is at zero (0) degrees). However, again, it should be understood that the field of view FOV in a vertical plane below the horizontal plane may be more or less than a negative 75 degrees relative to the horizontal plane depending in design (e.g. −30, −45, −60, −65, −70, −80, −85 degrees).

Referring back to FIG. 3, in certain embodiments, it may be possible to contain the contents of housing/enclosure 362 within a hub 350 within globe-shaped sensor head 302, which may then be configured/operable to communicate wirelessly with receiver/hub 100 via suitable circuitry on printed circuit board 376 and transmitter 382 which may be therein, in which case globe-shaped sensor head 302 may be totally enclosed and understood to have a 360 degree field of view FOV in the vertical plane (around the horizontal axis).

Thus, in light of the foregoing, a laser signal sensor 300 may be provided which overcomes certain field of view FOV and noise limitations in the art.

Figure 12:
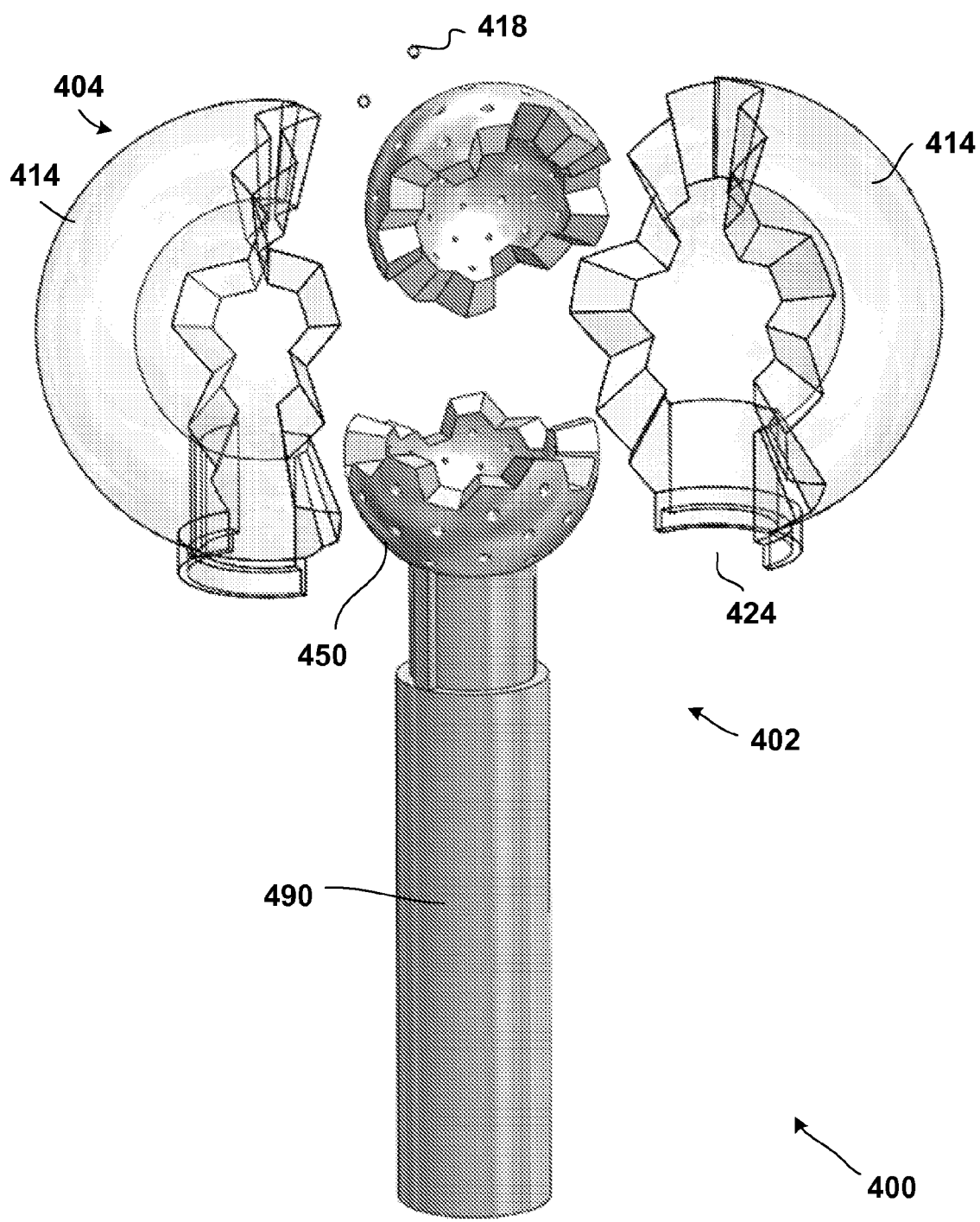
FIG. 12 is schematic exploded perspective view of another sensor head of another embodiment of a laser signal sensor according the present disclosure.
Figure 13:
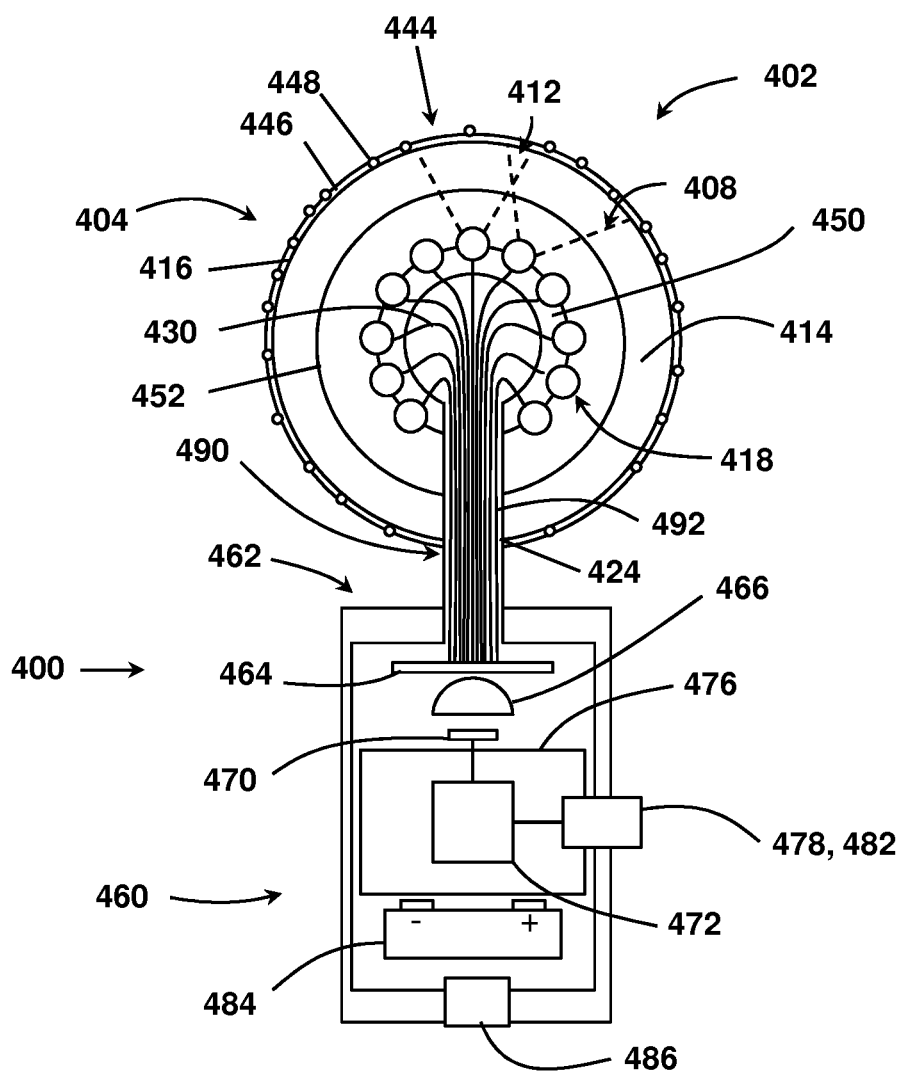
FIG. 13 is a schematic cross-sectional side view of the laser signal sensor of FIG. 12.

Referring now to FIGS. 12 and 13, there is shown another laser signal sensor 400 according to the present disclosure. Laser signal sensor 400 and laser signal sensor 300 may be understood to show the same structure for optical-to-electrical converter 460 and 360, respectively. However, globe-shaped sensor head 402 is shown to be of a different construction as compared to globe-shaped sensor head 302.

In contrast to the globe-shaped optical member 304 for laser signal sensor 300, the globe-shaped optical member 404 of laser signal sensor 400 is shown to be a substantially complete sphere without any facets. Globe-shaped sensor head 402, and in particular globe-shaped optical member 404, is shown to have a shape of a substantially complete sphere, as opposed to a complete sphere, particularly due to exit of bundle 492 of optical fibers 430 therefrom within mounting post 490. In certain embodiments globe-shaped optical member 404 may have an outer surface area of about 90% of a full sphere of a same dimension.

However, in certain embodiments, globe-shaped sensor head 402, and in particular globe-shaped optical member 404 may have a shape of a complete sphere as where the contents of housing/enclosure 462 are contained within hub 450 within globe-shaped sensor head 402, which may then be configured/operable to communicate wirelessly with receiver/hub 100 via suitable circuitry on printed circuit board 476 and transmitter 482 which may be therein, in which case globe-shaped sensor head 402 may be totally enclosed and understood to have a 360 degree field of view FOV in the vertical plane (around the horizontal axis).

As shown in FIG. 12, the globe-shaped optical member 404 may be made of two outer optical elements 414 (e.g. two half spheres), as opposed to eleven or twelve separate clusters 328 for laser signal sensor 300 (depending upon whether one cluster is removed to provide an opening for the exit of the bundle 392 of optical fibers 330). Thus, the complexity of the globe-shaped optical member 404 may be greatly reduced as compared to globe-shaped optical member 304. In certain embodiments, the globe-shaped optical member 404 may be made of one piece hollow shell, provided an opening 424 may be formed or otherwise provided at the base thereof which is large enough for hub 450 to pass into globe-shaped optical member 404, and for bundle 392 of optical fibers 330 to exit globe-shaped optical member 404.

Furthermore, for laser signal sensor 400, inner optical elements 418 are now connected to hub 450, in contrast to laser signal sensor 300 wherein inner optical elements 318 are connected to outer optical elements 314 with the aid of plug 338. A plug is not utilized with laser sensor 400, thus eliminating another 66 pieces from the design.

Figure 14:
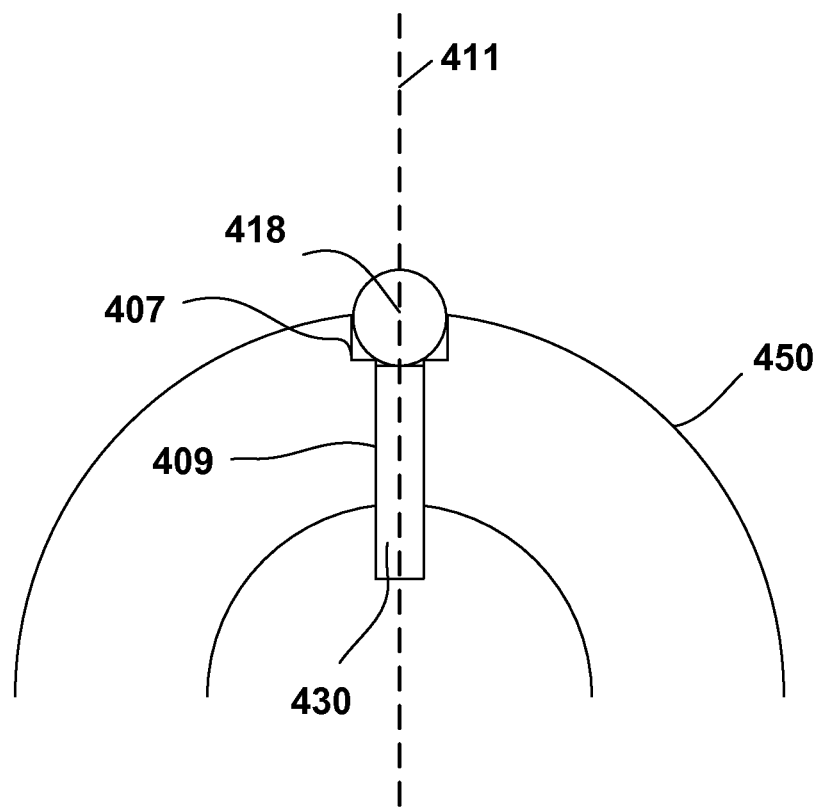
FIG. 14 is an enlarged cross-sectional view of a portion of the sensor head of laser signal sensor of FIG. 12.

As shown in FIG. 14, in certain embodiments, at least one inner optical element 418 may be interference (press) fit into a counterbore 407 formed within hub 450. Hub 450 may be made of a suitable material, such as a plastic, which compresses to form the press fit with the inner optical element 418. The respective optical fiber 430 optically coupled to the inner optical element 418 may be inserted into a thru-hole 409 at the bottom of counterbore 407 to be positioned proximate to or make contact with the inner optical element 418. The thru-hole 409 may be formed on an axis 411 which may correspond with the axis 322 of laser signal sensor 300 whereby the inner optical elements 418 may be spaced from one another in similar fashion to laser signal sensor 300 (i.e. in the same pattern). In certain embodiments, each and every one of the inner optical elements 418 and optical fibers 450 may be assembled in the foregoing manner.

In contrast to outer optical elements 314 of laser signal sensor 300, which may be configured/operable to concentrate incident laser light which enters the outer optical elements 314, and may be understood to be lenses by virtue of converging incident laser light, outer optical elements 414 of laser sensor 400 may be configured/operable to diffuse incident laser light which enters the outer optical elements 414. Outer optical elements 414, which may be understood to provide a diffuser, reduce the impact of incidence angle, because light from any angle is uniformly diffused. Such may also helps to ensure continuity of coupling between overlapping fields of view FOV.

Outer optical elements 414 may be made of glass, or a plastic material, such as polymethyl methacrylate (PMMA) or polystyrene (PS), and may be transparent or translucent. In certain embodiments, translucent (semi-opaque) material may be more desirable due to bulk and surface scattering effects of the incident laser light, which may increase fiber coupling efficiency and uniformity.

To provide improved scattering at outer surface 416 of outer optical elements 414, the outer surface 416 of outer optical elements 414 may be coated by a light diffusion coating 444. Coating 444 may be applied to outer surface 416 of outer optical elements 414 by first applying a layer 446 of a mixture of white pigment, such as titanium dioxide, mixed with a clear coat at 25% of what is needed for sold white (i.e. 25% opaque). Once this cures, additional clear coat may be airbrushed onto outer optical elements 414 and then, before the clear coat dries, the outer optical elements 414 may be rolled in glass microbeads 448 (e.g. having a diameter of 10-40 microns) until the globe-shaped optical member 404 is covered uniformly with a single layer of the microbeads 448. Alternatively, the outer optical elements 414 may be placed in a fluidized bed of the glass microbeads 448 to otherwise contact the outer optical elements 414 and attach thereto. An exemplary formulation may comprise PPG part #900 white DCC, PPG clear coat concept DCU2021 urethane, PPG DCX61 high solids hardener, PPG DT 875 reducer and Corpuscular Glass microbeads, 40-70 micron diameter, C-PGL-07, Cat No. 149113-50.

In other embodiments, the globe-shaped optical member 404 may have the diffusive coating/material applied to the internal surface 452 of outer optical elements 414, or impregnated in the wall of globe-shaped optical member 404/outer optical elements 414.

Also to provide improved scattering at outer surface 416 of outer optical elements 414, the outer surface 416 of outer optical elements 414, the outer surface 416 may also be "frosted." In other words, the outer surface 416 of outer optical elements 414 may be made translucent, such as by roughening, so as to increase the surface asperities thereof, resulting in increased light diffusion. The outer surface 416 may also be frosted, such as by sand blasting (e.g. abrasive media may include sand, plastic, walnut shells, garnet) acid etching, silk screening or application of powdered glass to surface 416, while the remainder of the outer optical elements 414 may remain, for example, transparent.

The scattering at the surface 416 and within the material 414 may cause the globe-shaped sensor head 402 to glow, like a Lambertian source. The scattered incident laser light may then be coupled into an optical fiber 430, or coupled externally to a photo-detector using one or more concentrator lenses as explained in greater detail below.

Scattered laser light within outer optical elements 414 may then emanate from outer optical elements 414 within globe-shaped sensor head 302, particularly at surface 352, and thereafter be receivable by inner optical elements 418, which may then couple the laser light into a respective optical fiber 430, particularly into an end (aperture) thereof, in similar manner to that of sensor 300.

To inhibit blind spots between adjacent inner optical elements 418 (i.e. locations where laser light 20 may not be detected), the steradian acceptance angle 408 of one or more inner optical elements 418 may share a common boundary with the steradian acceptance angle 408 occupied by an adjacent inner optical element 418. In this manner, a continuous (uninterrupted) field of view FOV may be provided by the adjacent inner optical elements 418.

In certain embodiments, one or more of the inner optical elements 418 may have a respective field of view FOV (as determined by the acceptance angle) which may be understood to overlap 412 with one or more adjacent inner optical elements 418. In other embodiments, to ensure there are no blind spots between inner optical elements 418, each and every one of the inner optical elements 418 may be understood to have a respective field of view FOV which overlaps 412 with the respective field of view FOV of each and every adjacent inner optical element 418.

One or more of the inner optical elements 418 may be a ball lens, and may be made of glass, or a plastic material, such as polymethyl methacrylate (PMMA) or polystyrene (PS), and may be transparent or translucent. In certain embodiments, each and every one of the inner optical elements 418 may respectively comprise a ball lens, which may increase the magnitude and uniformity of the coupling of incident laser light into the optical fibers 430.

One or more of the inner optical elements 418 may have an optical (principal) axis 422, and inner optical element 418 may comprise a graded index lens having an index of refraction which increases with an increasing distance radially away from the optical axis 422. In certain embodiments, each and every one of the inner optical elements 418 may have a respective optical axis 422, and each and every one of the inner optical elements 418 may respectively comprise a graded index lens having an index of refraction which increases with an increasing distance radially away from the respective optical axis 422.

In certain embodiments, one or more inner optical members 318 may have an optical axis 422, which may be in common with a longitudinal axis of its respective optical fiber 430 at its end. More particularly, in certain embodiments, each and every one of the inner optical members 418 may have optical axis as shown by axis 422, which may be in common with a longitudinal axis of its respective optical fiber 430 at its end.

Thereafter, one or more of the optical fibers 430 may transmit incidental laser light to an optical-to-electrical converter 460 to convert the incident laser light to a low noise electronic output/signal. In certain embodiments, each and every one of the optical fibers 430 may transmit incident laser light to optical-to-electrical converter 460 to convert the incident laser light to a low noise electronic output/signal. Converter 460 in the present embodiment may be understood to be structurally similar and operate in similar fashion to converter 360 of the previous embodiment.

Figure 15:
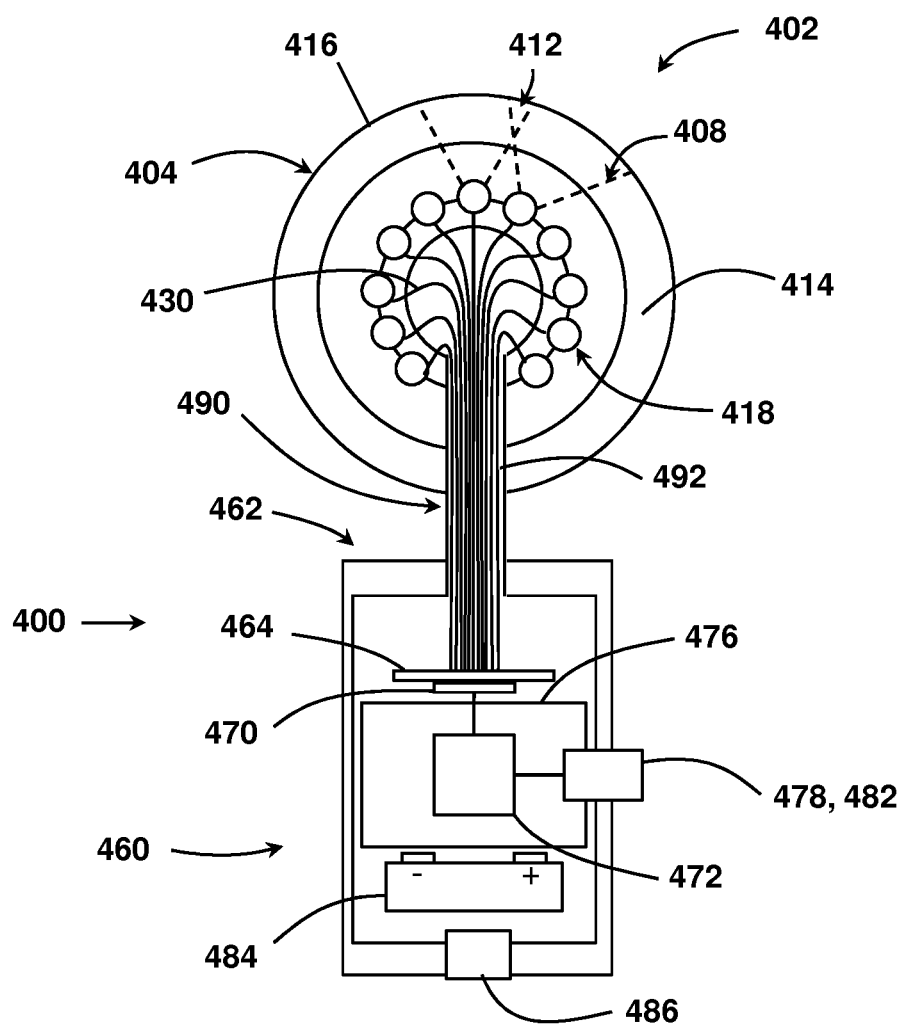
FIG. 15 is a schematic cross-sectional side view of another exemplary laser signal sensor according to the present disclosure.

Referring now to FIG. 15, there is shown another embodiment of laser signal sensor 400 with an optical-to-electric converter 460 wherein condenser lens 466 has been eliminated, and optoelectric detector 470 may more particularly comprise an array of photo-detectors.

Figure 16:
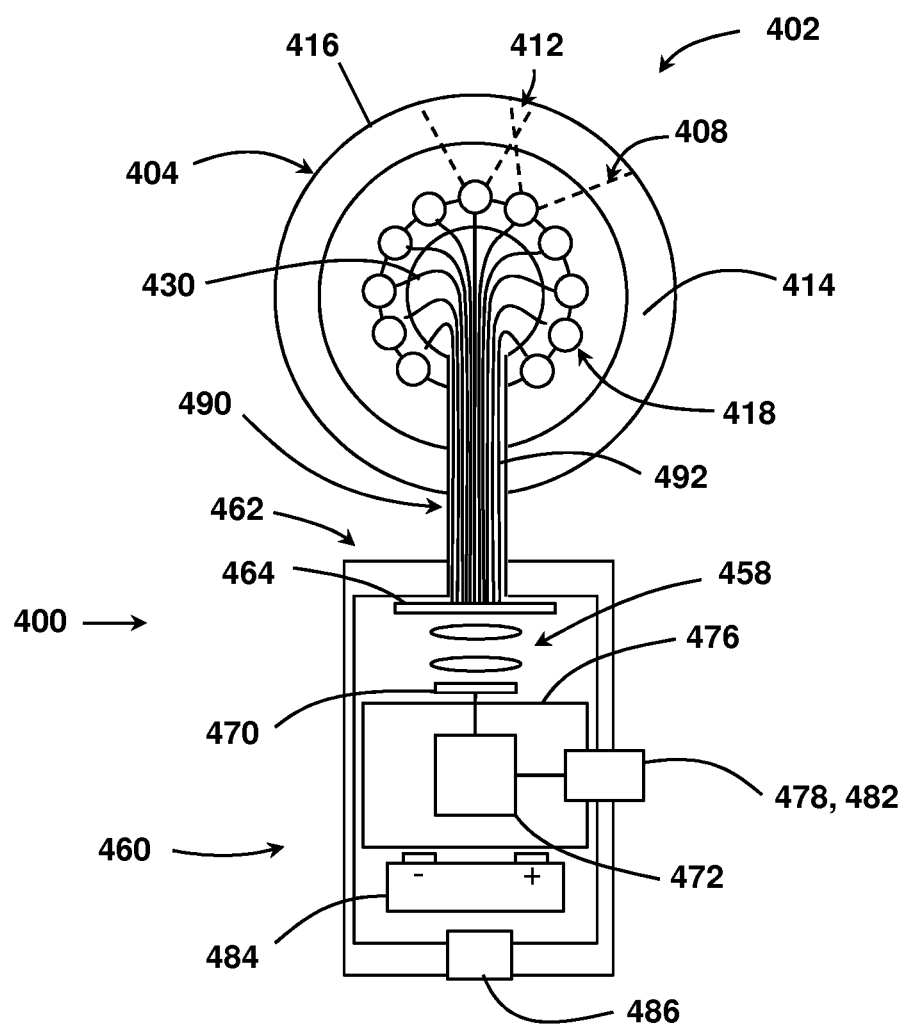
FIG. 16 is a schematic cross-sectional side view of another exemplary laser signal sensor according to the present disclosure.

Referring now to FIG. 16, there is shown another embodiment of laser signal sensor 400 with an optical-to-electric converter 460 wherein condenser lens 466 has been eliminated, and imaging lens 458 have been added to the sensor 400.

Figure 17:
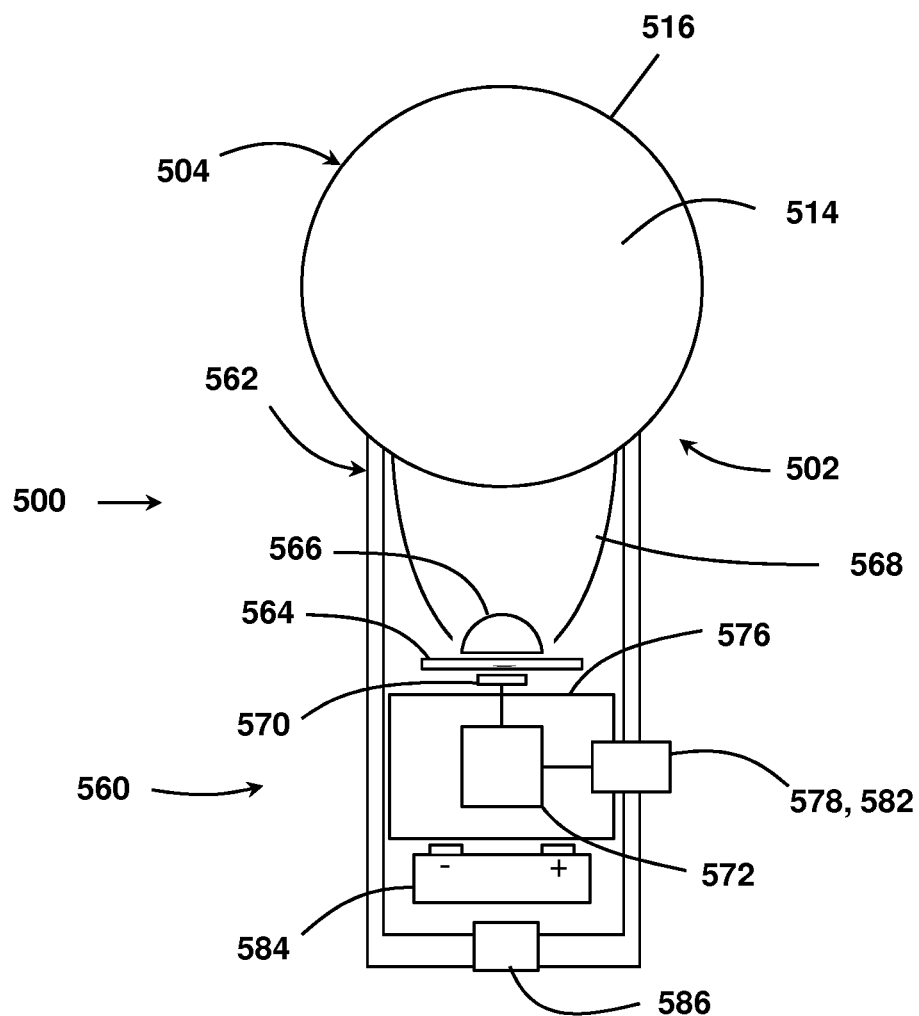
FIG. 17 is a schematic cross-sectional side view of another exemplary laser signal sensor according to the present disclosure.

Referring now to FIG. 17, there is shown another laser sensor 500 according to the present disclosure. In contrast to laser sensors 300 and 400, all of the inner optical elements 318/418 and optical fibers 330/430 (another 132 pieces) may be eliminated, thus greatly simplifying the design.

As shown, laser sensor 500 may comprise a globe-shaped sensor head 502, particularly comprising a globe-shaped optical member 504. In contrast to the globe-shaped optical member 404 of laser sensor 400, the globe-shaped optical member 504 of sensor head 502 is shown to be a complete (full) sphere. Furthermore, the globe-shaped optical member 504 is shown to be made of only one optical element 514 having a single piece monolithic construction, thus, the complexity of the globe-shaped optical member 504 may again be reduced as compared to prior embodiments.

Optical element 514 may comprise a solid or a hollow shell sphere. Optical element 514 may be made of glass, or a plastic material, such as polymethyl methacrylate (PMMA) or polystyrene (PS), and may be transparent or translucent. In certain embodiments, translucent (semi-opaque) material may be more desirable due to bulk and surface scattering effects of the incident laser light, which may increase fiber coupling efficiency and uniformity.

Similar to globe-shaped optical member 404, globe-shaped optical member 504 is configured/operable to diffuse incident laser light which contacts globe-shaped optical member 504. More particularly, an outer surface 516 of the globe-shaped optical member 504 may be configured/operable to diffuse incident laser light which contacts the outer surface 516 of the globe-shaped optical member 504, and the globe-shaped optical member 504 may be configured/operable to uniformly diffuse the incident laser light at the outer surface 516. Even more particularly, the sensor head 502 is configured/operable to enable incident laser light to enter the globe-shaped optical member 504 and subsequently emanate from the globe-shaped optical member 502 to be received by the optical-to-electrical converter 560 as explained in greater detail below. Thus, rather than incident laser light being coupled internally within optical element 514, particularly an optical fiber, in the present embodiment scattered incident laser light may be more particularly coupled externally to optical-to-electric converter 560.

To provide improved scattering at outer surface 516 of optical element 514, the outer surface 516 of optical element 514 may be coated by a light diffusion coating and/or frosted as disclosed above, which may cause the globe-shaped sensor head 402 to glow, like a Lambertian source.

As shown, sensor head 502 may be mounted to a hollow cylindrical housing/enclosure 562, which may also be considered a mounting post. The sensor head 502 may be mounted to the hollow cylindrical housing/enclosure 562 by a bead of adhesive epoxy located between the housing/enclosure 462 and the sensor head 502. A mirrored light concentrator 568 (e.g. a compound parabolic concentrator) may be concentrically mounted within the cylindrical housing/enclosure 562 and collect light emanating from the outer surface 516 of globe-shaped optical member 502. Thus, the light concentrator 568 may be configured/operable to receive laser light which emanates from the globe-shaped optical member 502 and concentrate the laser light prior to the laser light being received by an optoelectronic detector 570.

A condenser lens 566 may be mounted at the throat of the mirrored concentrator 568 to further concentrate the light onto a single EMI shielded optoelectronic detector 570 (e.g. photo-detector such as a photo-diode). With the condenser lens 566, light leaving the light concentrator 568 is concentrated at a point which lies on the axis of cylindrical housing 562.

An optical notch filter 564 (e.g. a dielectric optical bandpass filter) is stacked between the condenser lens 566 and an EMI shielded optoelectronic detector 570 to filter out light outside the desired laser light wavelengths. More particularly, the optical filter 564 is configured/operable to block wavelengths of light other than laser light wavelengths; and the optical filter 564 is configured/operable to receive laser light which emanates from the globe-shaped optical member 504 and filter the laser light prior to the laser light being received by the optoelectronic detector 570. The filter notch width is sufficiently wide to accommodate manufacturing tolerances and ambient temperature variation (i.e. approximately 10-30 nm wide).

The EMI-shielded optoelectronic detector 570 and amplifier/processing circuit 572 convert the incident optical signal into a low-noise electronic output voltage signal which can, for example, be used to calculate the position of the center of the globe-shaped optical member 502. The output may then be coupled to an electronic output connector (e.g. SMA connector) 578 to be wired to receiver/hub 100, or a transmitter 582 which may configured/operable to transmit the electronic signal to receiver/hub 100.

The aperture of the photodetector 570 may be covered by a film of indium tin oxide (ITO), which is approximately 90% transparent to light, but provides shielding from EMI. A conductive wire mesh may also provide EMI shielding effect. The amplifier/processing circuit 572 may be coupled to an analog to digital (A/D) circuit, which may be part of a printed circuit board 576, to convert the signal immediately to a digital signal.

Thus, a laser sensor 500 is disclosed which is configured/operable to protect the signal integrity of the sensor. This may be accomplished through the use of primary optics to collect and concentrate light onto a single optically filtered and electrically shielded photodetector 570, eliminating the need for multiple photodiodes, which, due to manufacturing tolerances, might not be equally responsive, or symmetrically mounted. The cylindrical housing/enclosure 562 may also provide shielding to the photodetector 570, amplifier/processing circuit 572, and conductors. The collocation of the amplifier/processing circuit 572 and photodetector 570 may reduce parasitic signal loss associated with long wire leads and minimizes EMI that could otherwise couple onto the conductors.

It is important for accuracy that the mechanical relationship between the globe-shaped optical member 502 and its mount is not changed during use. One possible source of variation is thermal expansion/contraction. Therefore, structural components of laser sensor 500 should be built from materials with minimal coefficient of linear thermal expansion. For instance, the globe-shaped optical member 504 might be made from Borosilicate glass, which has a CLTE of 3 um/m. The cylindrical housing/enclosure 562 might be manufactured from Invar (iron-nickel alloy), 0.5 um/m CLTE, or from carbon fiber composite, 1 um/m CLTE, or gray cast iron, 4 um/m, which is still low compared to most alternatives.

Figure 18:
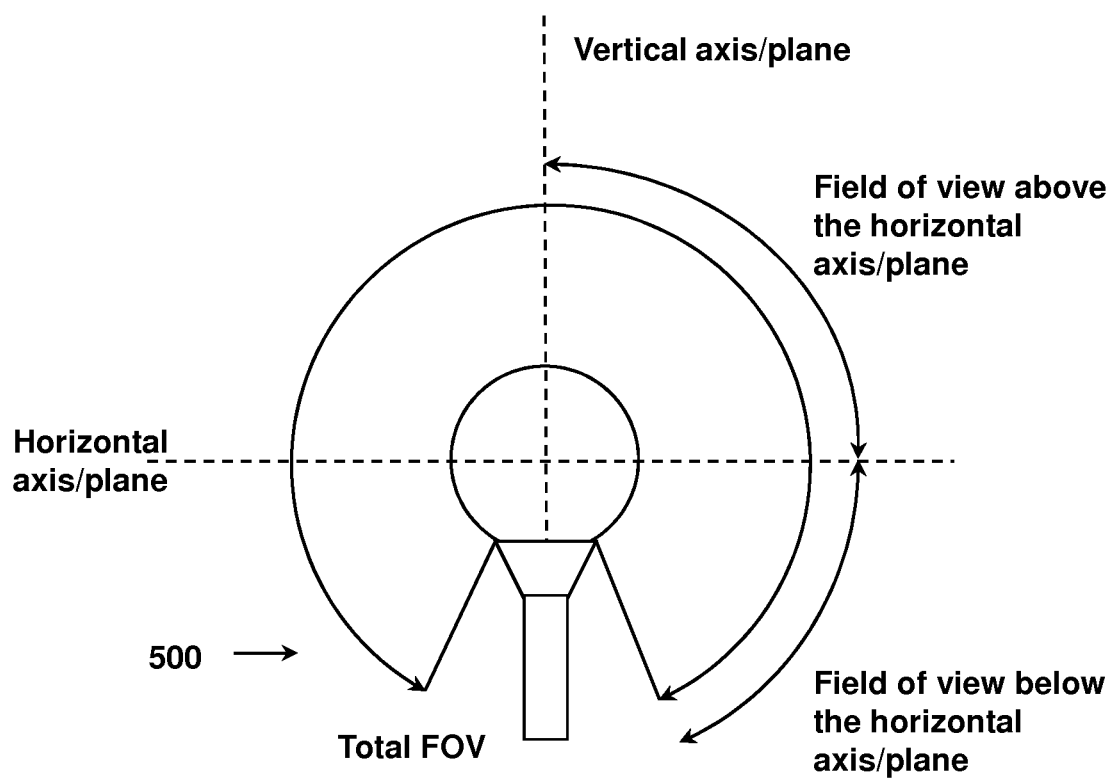
FIG. 18 is a schematic side view of the exemplary laser sensor of FIG. 17 showing the field of view thereof in the vertical plane.

As shown in FIG. 18,), globe-shaped sensor head 502, in addition to being configured/operable to provide up to a 360 degree field of view FOV in the horizontal plane around the vertical axis, which may be understood to be continuous/uninterrupted (i.e. with no blind spots), globe-shaped sensor head 302 may configured/operable to provide a field of view FOV in a vertical plane above the horizontal plane of up to positive 90 degrees (i.e. +90°) relative to the horizontal plane, which also may be understood to be continuous/uninterrupted (where the positive value denotes the field of view FOV above the horizontal plane and the horizontal plane itself is at zero (0) degrees). While the field of view FOV in a vertical plane above the horizontal plane may be up to positive 90 degrees relative to the horizontal plane, it should be understood that the field of view FOV in a vertical plane above the horizontal plane may be configured/operable to be less than a positive 90 degrees relative to the horizontal plane (e.g. up to +30, +45, +60 or +75 degrees).

The globe-shaped sensor head 502 may also be understood to have a field of view FOV in a vertical plane below the horizontal plane, also continuous/uninterrupted, which may only be limited by the size of housing/enclosure 562. In certain embodiments, the globe-shaped sensor head 502 may be configured/operable to provide a field of view FOV in a vertical plane below the horizontal plane of up to for negative 75 degrees (i.e. −75°) relative to the horizontal plane, which also may be understood to be continuous/uninterrupted (where the negative value denotes the field of view below the horizontal plane and the horizontal plane itself is at zero (0) degrees). However, again, it should be understood that the field of view FOV in a vertical plane below the horizontal plane may be more or less than a negative 75 degrees relative to the horizontal plane depending in design (e.g. −30, −45, −60, −65, −70, −80, −85 degrees).

Figure 19:
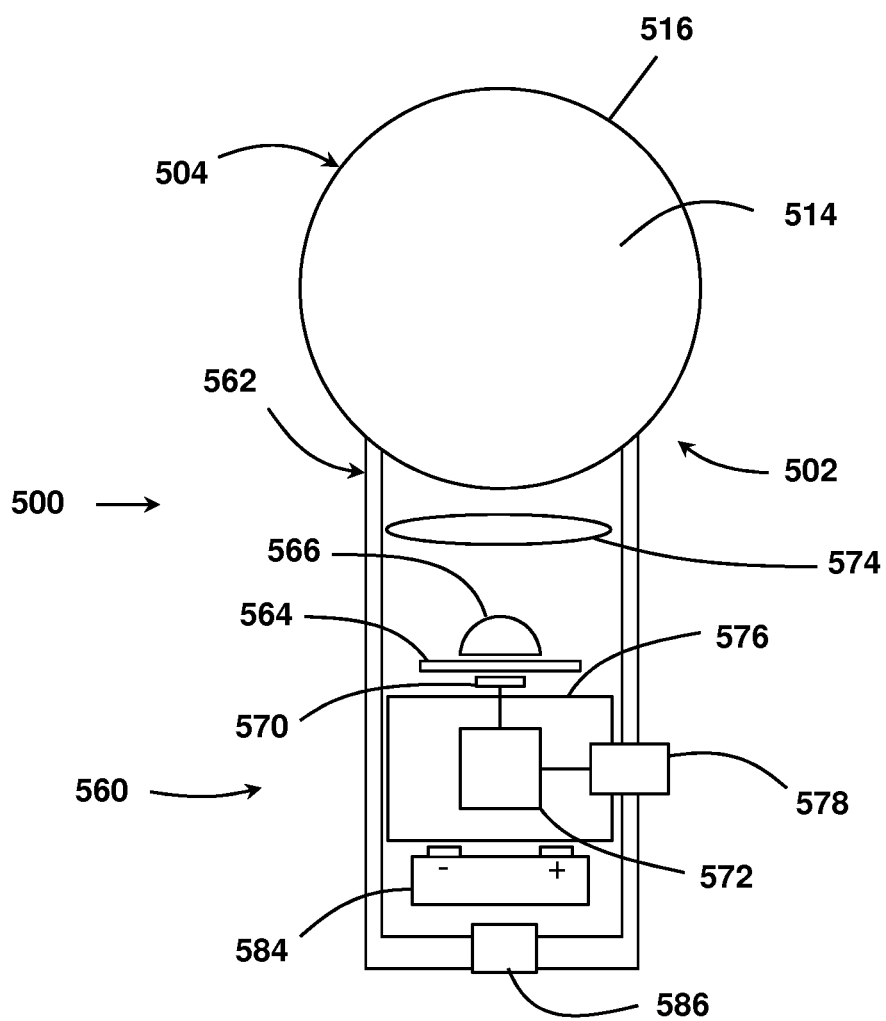
FIG. 19 is a schematic cross-sectional side view of another exemplary laser signal sensor according to the present disclosure.

Referring now to FIG. 19, there is shown another embodiment of laser signal sensor 500 with an optical-to-electric converter 560 wherein the mirrored light concentrator 568 has been eliminated, and a concentrator lens 574 have been added to the sensor 500.

Figure 20:
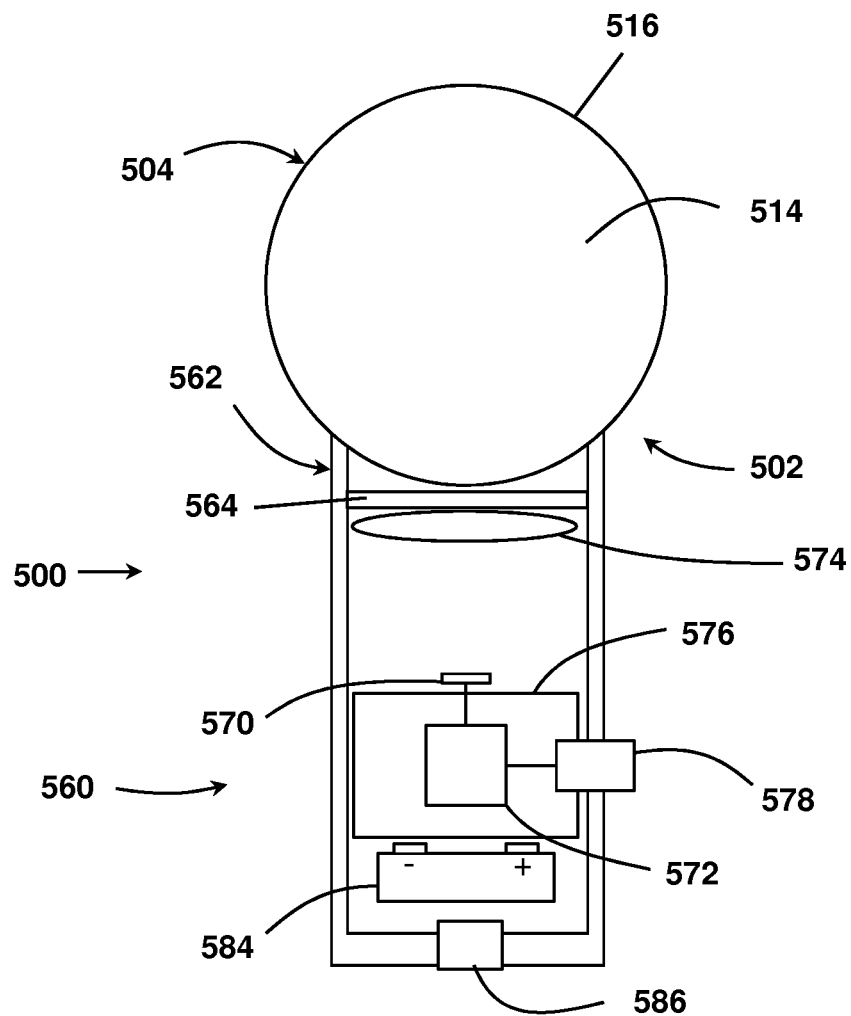
FIG. 20 is a schematic cross-sectional side view of another exemplary laser signal sensor according to the present disclosure.

Referring now to FIG. 20, there is shown another embodiment of laser signal sensor 500 with an optical-to-electric converter 560 wherein the optical filter 564 has been moved between globe-shaped optical member 502 and concentrator lens 574, and condenser lens 566 has been eliminated.

Figure 21:
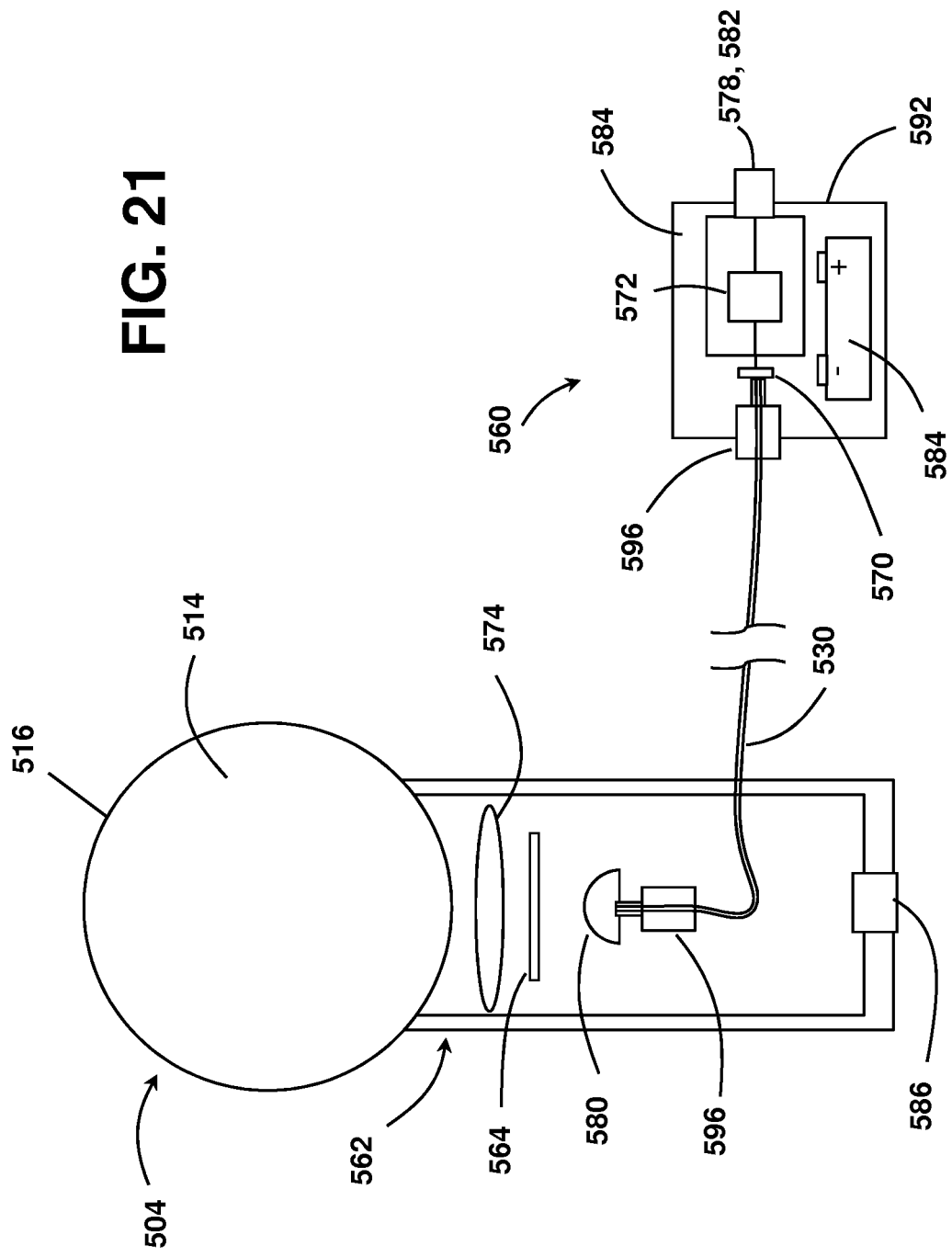
FIG. 21 is a schematic cross-sectional side view of another exemplary laser signal sensor according to the present disclosure.

Referring now to FIG. 21, there is shown another embodiment of laser signal sensor 500 with an optical-to-electric converter 560 wherein the condenser lens 566 has been eliminated and a coupling lens 580 has been added to the sensor 500. As shown, optical-to-electric converter 560 has been removed from the mounting housing 562 for sensor head 502 and located in a separate EMI shielded housing/enclosure 594, which are connected by a optical fiber 530 coupled by fiber connectors 596 at each end thereof to a coupling lens 580 and optoelectronic detector 570. Thus, light may now travel through coupling lens 580 and optical fiber 530 to optoelectronic detector 570. Consequently, the optoelectronic detector 570 can be coupled to the light concentrating optic(s) (i.e. mirrored light concentrator 568, condenser lens 566) via an optical fiber 530 similar to laser sensors 300 and 400, but with all related electrical components housed in a separate EMI shielded enclosure 594.

What is claimed:

1. A laser signal sensor comprising:
a sensor head to receive laser light;
the sensor head comprising a globe-shaped optical member, the globe-shaped optical member optically coupled to an optical-to-electrical converter;
the optical-to-electrical converter operable to convert laser light from the sensor head to an electronic output signal; and
the sensor head operable to provide a 360 degree field of view in a horizontal plane and a positive (+) 90 degree field of view in a vertical plane above the horizontal plane.

2. The sensor of claim 1 wherein:
the sensor head is operable to provide a field of view in the vertical plane below the horizontal plane.

3. The sensor of claim 1 wherein:
the globe-shaped optical member is spherical.

4. The sensor of claim 1 wherein:
the globe-shaped optical member is a full sphere.

5. The sensor of claim 1 wherein:
the globe-shaped optical member is of a single piece monolithic construction.

6. The sensor of claim 1 wherein:
the globe-shaped optical member is at least one of translucent and transparent.

7. The sensor of claim 1 wherein:
the globe-shaped optical member is operable to diffuse incident laser light which contacts the globe-shaped optical member.

8. The sensor of claim 1 wherein:
the globe-shaped optical member has an outer surface; and
the globe-shaped optical member is operable to diffuse the incident laser light at the outer surface.

9. The sensor of claim 1 wherein:
the globe-shaped optical member has an outer surface; and
the outer surface is translucent.

10. The sensor of claim 1 wherein:
the globe-shaped optical member has an outer surface; and
the outer surface is at least one of sand blasted, acid etched and silk screened.

11. The sensor of claim 1 wherein:
the globe-shaped optical member has an outer surface; and
the outer surface is coated with a light diffusion coating.

12. The sensor of claim 1 wherein:
the globe-shaped optical member has an outer surface; and
the outer surface is coated with glass beads.

13. The sensor of claim 1 wherein:
the globe-shaped optical member has an outer surface; and
the outer surface is coated with powdered glass.

14. The sensor of claim 1 wherein:
the sensor head is operable to enable incident laser light to enter the globe-shaped optical member and subsequently emanate from the globe-shaped optical member to be received by the optical-to-electrical converter.

15. The sensor of claim 1 wherein:
the optical-to-electrical converter comprises at least one photo-detector.

16. The sensor of claim 15 wherein:
the photo-detector comprises a photo-diode, photo-resistor or photo-transistor.

17. The sensor of claim 1 further comprising:
a light concentrating optic; and
the light concentrating optic is operable to receive laser light from the globe-shaped optical member and concentrate the laser light prior to the laser light being received by the photo-detector.

18. The sensor of claim 17 wherein:
the light concentrating optic comprises a compound parabolic concentrator.

19. The sensor of claim 17 wherein:
the light concentrating optic comprises a mirrored concentrator.

20. The sensor of claim 17 wherein:
the light concentrating optic comprises a concentrator lens.

21. The sensor of claim 1 further comprising:
an optical filter operable to block wavelengths of light other than laser light wavelengths; and
the optical filter is operable to receive laser light which emanates from the globe-shaped optical member and arranged to filter the laser light prior to the laser light being received by the photo-detector.

22. The sensor of claim 1 further comprising:
an amplifier.

23. The sensor of claim 1 further comprising:
a power supply.

24. The sensor of claim 1 further comprising:
an electromagnetically shielded enclosure.

25. The sensor of claim 1 further comprising:
an electrical output connector.

26. The sensor of claim 1 further comprising:
a transmitter.

27. The sensor of claim 1 further comprising:
a coupling lens.

28. The sensor of claim 1 further comprising:
an optical fiber.

29. The sensor of claim 1 further comprising:
mounting means.

* * * * *